United States Patent
Colossi et al.

(10) Patent No.: US 7,480,663 B2
(45) Date of Patent: Jan. 20, 2009

(54) MODEL BASED OPTIMIZATION WITH FOCUS REGIONS

(75) Inventors: Nathan Gevaerd Colossi, Sao Paulo (BR); Daniel Martin DeKimpe, La Selva Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/874,398

(22) Filed: Jun. 22, 2004

(65) Prior Publication Data

US 2005/0283488 A1    Dec. 22, 2005

(51) Int. Cl.
*G06F 17/00*    (2006.01)
(52) U.S. Cl. ............................ 707/100; 700/3; 715/700
(58) Field of Classification Search .................. 707/103, 707/3, 100
See application file for complete search history.

(56) References Cited

U.S. PATENT DOCUMENTS

| | | | |
|---|---|---|---|
| 5,537,524 A | 7/1996 | Aprile | ........................ 395/140 |
| 5,692,107 A | 11/1997 | Simoudis et al. | |
| 5,692,175 A | 11/1997 | Davies et al. | |
| 5,748,188 A | 5/1998 | Hu et al. | |
| 5,767,854 A | 6/1998 | Anwar | ........................ 345/355 |
| 5,832,475 A | 11/1998 | Agrawal et al. | |
| 5,832,496 A | 11/1998 | Anand et al. | |
| 5,870,746 A | 2/1999 | Knutson et al. | |
| 5,905,985 A | 5/1999 | Malloy et al. | ................ 707/101 |
| 5,918,232 A | 6/1999 | Pouschine et al. | ........... 707/103 |
| 5,926,818 A | 7/1999 | Malloy | ........................ 707/100 |
| 5,943,668 A | 8/1999 | Malloy et al. | ................... 707/3 |
| 5,960,423 A | 9/1999 | Chaudhuri et al. | |
| 5,978,788 A | 11/1999 | Castelli et al. | ................. 707/2 |
| 5,991,754 A | 11/1999 | Raitto et al. | |
| 6,003,024 A | 12/1999 | Bair et al. | |
| 6,003,036 A | 12/1999 | Martin | |
| 6,031,977 A | 2/2000 | Pettus | |
| 6,092,064 A | 7/2000 | Aggarwal et al. | |
| 6,115,547 A | 9/2000 | Ghatate et al. | |
| 6,122,636 A | 9/2000 | Malloy et al. | ................ 707/102 |

(Continued)

FOREIGN PATENT DOCUMENTS

JP      09106331      4/1997

(Continued)

OTHER PUBLICATIONS

P. Vassiliadis, "Modeling Multidimensional Databases, Cubes and Cube Operations," ssdbm, pp. 53-62, 10th International Conference on Scientific and Statistical Database Management, 1998.*

(Continued)

*Primary Examiner*—Khanh B. Pham
*Assistant Examiner*—Jieying Tang
(74) *Attorney, Agent, or Firm*—Janet M. Skafar; Christine H. Smith; Erin C. Ming

(57) ABSTRACT

Various embodiments of a method, system and computer program product for optimization of a multidimensional model in a model based performance advisor are disclosed. The multidimensional model comprises groups. Each group has one or more levels. One or more recommended slices associated with the groups are determined based on a focus region.

18 Claims, 15 Drawing Sheets

U.S. PATENT DOCUMENTS

| | | | |
|---|---|---|---|
| 6,134,532 A | 10/2000 | Lazarus et al. | |
| 6,144,962 A | 11/2000 | Weinberg et al. | |
| 6,175,836 B1 | 1/2001 | Aldred | 707/103 |
| 6,205,447 B1 | 3/2001 | Malloy | 707/102 |
| 6,226,647 B1 | 5/2001 | Venkatasubramanian et al. | |
| 6,249,791 B1 | 6/2001 | Osborn et al. | 707/200 |
| 6,292,797 B1 | 9/2001 | Tuzhilin et al. | |
| 6,308,168 B1 | 10/2001 | Dovich et al. | |
| 6,317,750 B1 | 11/2001 | Tortolani et al. | 707/103 |
| 6,324,533 B1 | 11/2001 | Agrawal et al. | |
| 6,327,574 B1 | 12/2001 | Kramer et al. | |
| 6,339,776 B2 | 1/2002 | Dayani-Fard et al. | |
| 6,362,823 B1 | 3/2002 | Johnson et al. | 345/440 |
| 6,366,903 B1 | 4/2002 | Agrawal et al. | 707/2 |
| 6,374,234 B1 | 4/2002 | Netz | 707/2 |
| 6,385,604 B1 | 5/2002 | Bakalash et al. | |
| 6,385,609 B1 | 5/2002 | Barshefsky et al. | |
| 6,408,292 B1 | 6/2002 | Bakalash et al. | 707/2 |
| 6,418,428 B1 | 7/2002 | Bosch et al. | |
| 6,438,537 B1 | 8/2002 | Netz et al. | 707/3 |
| 6,449,609 B1 | 9/2002 | Witkowski | |
| 6,477,536 B1 | 11/2002 | Pasumansky et al. | 707/102 |
| 6,480,836 B1 * | 11/2002 | Colby et al. | 707/3 |
| 6,484,179 B1 * | 11/2002 | Roccaforte | 707/102 |
| 6,539,371 B1 | 3/2003 | Bleizeffer et al. | |
| 6,542,895 B1 | 4/2003 | DeKimpe et al. | 707/101 |
| 6,546,381 B1 | 4/2003 | Subramanian et al. | 707/2 |
| 6,546,395 B1 | 4/2003 | DeKimpe et al. | 707/101 |
| 6,567,796 B1 | 5/2003 | Yost et al. | |
| 6,574,619 B1 | 6/2003 | Reddy et al. | |
| 6,574,791 B1 | 6/2003 | Gauthier et al. | |
| 6,581,054 B1 | 6/2003 | Bogrett | 707/4 |
| 6,581,068 B1 | 6/2003 | Bensoussan et al. | 707/104.1 |
| 6,604,110 B1 | 8/2003 | Savage et al. | |
| 6,609,123 B1 | 8/2003 | Cazemier et al. | |
| 6,615,201 B1 | 9/2003 | Seshadri et al. | |
| 6,628,312 B1 | 9/2003 | Rao et al. | 345/853 |
| 6,633,882 B1 | 10/2003 | Fayyad et al. | 707/101 |
| 6,633,885 B1 | 10/2003 | Agrawal et al. | |
| 6,636,845 B2 | 10/2003 | Chau et al. | 707/1 |
| 6,636,853 B1 | 10/2003 | Stephens, Jr. | 707/10 |
| 6,643,633 B2 | 11/2003 | Chau et al. | 707/1 |
| 6,643,661 B2 | 11/2003 | Polizzi et al. | |
| 6,651,055 B1 | 11/2003 | Kilmer et al. | 707/3 |
| 6,654,764 B2 | 11/2003 | Kelkar et al. | |
| 6,665,682 B1 | 12/2003 | DeKimpe et al. | 707/101 |
| 6,671,689 B2 | 12/2003 | Papierniak | |
| 6,681,223 B1 | 1/2004 | Sundaresan | |
| 6,684,207 B1 * | 1/2004 | Greenfield et al. | 707/3 |
| 6,694,322 B2 * | 2/2004 | Warren et al. | 707/101 |
| 6,697,808 B1 | 2/2004 | Hurwood et al. | |
| 6,707,454 B1 | 3/2004 | Barg et al. | 345/440 |
| 6,711,579 B2 | 3/2004 | Balakrishnan | |
| 6,711,585 B1 | 3/2004 | Copperman et al. | |
| 6,714,940 B2 | 3/2004 | Kelkar | |
| 6,768,986 B2 | 7/2004 | Cras et al. | |
| 6,775,662 B1 | 8/2004 | Witkowski et al. | |
| 6,801,992 B2 | 10/2004 | Gajjar et al. | |
| 6,823,334 B2 | 11/2004 | Vishnubhotia et al. | |
| 6,831,668 B2 | 12/2004 | Cras et al. | |
| 6,842,758 B1 | 1/2005 | Bogrett | |
| 6,871,140 B1 | 3/2005 | Florance et al. | |
| 6,898,603 B1 | 5/2005 | Petculescu et al. | |
| 6,931,418 B1 | 8/2005 | Barnes | |
| 6,947,929 B2 | 9/2005 | Bruce et al. | |
| 6,957,225 B1 | 10/2005 | Zait et al. | |
| 7,007,039 B2 | 2/2006 | Chaudhuri et al. | |
| 7,051,038 B1 | 5/2006 | Yeh et al. | |
| 7,181,450 B2 | 2/2007 | Malloy et al. | |
| 7,191,169 B2 | 3/2007 | Tao | |
| 7,203,671 B1 | 4/2007 | Wong | |
| 7,246,116 B2 | 7/2007 | Barsness et al. | |
| 7,275,024 B2 | 9/2007 | Yeh et al. | |
| 2001/0026276 A1 | 10/2001 | Sakamoto et al. | |
| 2001/0037228 A1 | 11/2001 | Ito et al. | |
| 2001/0037327 A1 | 11/2001 | Haas et al. | 707/2 |
| 2001/0047355 A1 | 11/2001 | Anwar | |
| 2001/0047364 A1 | 11/2001 | Proctor | 707/104.1 |
| 2001/0051947 A1 | 12/2001 | Morimoto et al. | |
| 2001/0055018 A1 | 12/2001 | Yaginuma et al. | 345/440 |
| 2002/0002469 A1 | 1/2002 | Hillstrom | |
| 2002/0029207 A1 | 3/2002 | Bakalash et al. | 707/1 |
| 2002/0073088 A1 | 6/2002 | Beckmann et al. | |
| 2002/0078039 A1 | 6/2002 | Cereghini et al. | 707/4 |
| 2002/0087516 A1 | 7/2002 | Cras et al. | 707/2 |
| 2002/0091679 A1 | 7/2002 | Wright | |
| 2002/0091681 A1 | 7/2002 | Cras et al. | 707/3 |
| 2002/0095430 A1 | 7/2002 | Egilsson et al. | |
| 2002/0122078 A1 | 9/2002 | Markowski | 345/853 |
| 2002/0123993 A1 | 9/2002 | Chau et al. | 707/5 |
| 2002/0124002 A1 | 9/2002 | Su et al. | 707/100 |
| 2002/0129003 A1 | 9/2002 | Bakalash et al. | 707/1 |
| 2002/0129032 A1 | 9/2002 | Bakalash et al. | 707/101 |
| 2002/0138316 A1 | 9/2002 | Katz et al. | |
| 2002/0188587 A1 | 12/2002 | McGreevy | 707/1 |
| 2002/0188599 A1 | 12/2002 | McGreevy | 707/3 |
| 2003/0004914 A1 | 1/2003 | McGreevy | 707/1 |
| 2003/0004942 A1 | 1/2003 | Bird | |
| 2003/0014397 A1 | 1/2003 | Chau et al. | 707/3 |
| 2003/0033277 A1 | 2/2003 | Bahulkar et al. | 707/1 |
| 2003/0055813 A1 | 3/2003 | Chaudhuri | |
| 2003/0055832 A1 | 3/2003 | Roccaforte | |
| 2003/0061207 A1 | 3/2003 | Spektor | |
| 2003/0071814 A1 | 4/2003 | Jou et al. | 345/440 |
| 2003/0078852 A1 | 4/2003 | Shoen et al. | |
| 2003/0078913 A1 | 4/2003 | McGreevy | 707/3 |
| 2003/0081002 A1 | 5/2003 | De Vorchik et al. | |
| 2003/0093424 A1 | 5/2003 | Chun et al. | |
| 2003/0101202 A1 | 5/2003 | Kelkar et al. | |
| 2003/0115183 A1 | 6/2003 | Abdo et al. | |
| 2003/0115207 A1 | 6/2003 | Bowman et al. | |
| 2003/0126144 A1 | 7/2003 | O'Halloran et al. | |
| 2003/0184588 A1 | 10/2003 | Lee | 345/772 |
| 2003/0206201 A1 | 11/2003 | Ly | 345/835 |
| 2003/0212667 A1 | 11/2003 | Andersch et al. | |
| 2003/0225768 A1 | 12/2003 | Chaudhuri et al. | 707/10 |
| 2004/0059705 A1 | 3/2004 | Wittke et al. | |
| 2004/0098415 A1 | 5/2004 | Bone et al. | |
| 2004/0122646 A1 | 6/2004 | Colossi et al. | 703/22 |
| 2004/0122844 A1 | 6/2004 | Malloy et al. | |
| 2004/0128287 A1 | 7/2004 | Keller et al. | 707/3 |
| 2004/0128314 A1 | 7/2004 | Katibah et al. | 707/103 |
| 2004/0139061 A1 | 7/2004 | Colossi et al. | 707/3 |
| 2004/0181502 A1 | 9/2004 | Yeh et al. | |
| 2004/0181538 A1 | 9/2004 | Lo et al. | |
| 2004/0215626 A1 | 10/2004 | Colossi et al. | 707/100 |
| 2004/0267774 A1 | 12/2004 | Lin et al. | 707/100 |
| 2005/0027754 A1 | 2/2005 | Gajjar et al. | |
| 2005/0033730 A1 | 2/2005 | Chaudhuri et al. | |
| 2005/0267868 A1 | 12/2005 | Liebl et al. | |
| 2005/0278290 A1 | 12/2005 | Bruce et al. | |

FOREIGN PATENT DOCUMENTS

| | | |
|---|---|---|
| JP | 10247197 | 9/1998 |
| JP | 2002-007435 | 1/2002 |
| JP | 2002 123530 A | 4/2002 |
| JP | 09146962 | 6/2007 |
| WO | 0022493 | 4/2000 |
| WO | 0065479 | 11/2000 |
| WO | WO 01/09768 A2 | 2/2001 |

WO  WO 01/29690 A2  4/2001

OTHER PUBLICATIONS

"Dynamically Configurable User Interface for the Manipulation of Data Objects," IBM Technical Disclosure Bulletin, vol. 37, No. 03, Mar. 1994, pp. 23-30.

D.A. Rabenhorst, "Many-Dimensional Visualization Technique," IBM Technical Disclosure Bulletin, vol. 35, No. 6, Nov. 1992, pp. 473-475.

C.L. Bird and S.G. Chapman, "Viewing Data within a Three-Dimensional Space by Two-Dimensional Devices,"IBM Technical Disclosure Bulletin, vol. 34, No. 12, May 1992, pp. 83-84.

"An Introduction to Multidimensional Database Technology", [online], © 1993-1995 Kenan Systems Corporation, [retrieved on Apr. 8, 2004]. Retrieved from the Internet: <URL: http://www.fing.edu.uy/inco/grupos/csi/esp/Cursos/cursos_act/2003/DAP_SistDW/Material/ken96.pdf>, pp. 1-29.

Tang, D., et al., "Design Choices with Architecting Visualizations,"IEEE Symposium on Information Visualization, 2003, INFOVIS 2003 [online], Oct. 19-21, 2003, [retrieved on Apr. 8, 2004]. Retrieved from the Internet: <URL: http://graphics.stanford.edu/~dtang/rivetsys.journal.pdf>. 10 pages.

Stolte, C., et al., "Query, Analysis, and Visualization of Hierarchically Structured Data using Polaris,"International Conference on Knowledge Discovery and Data Mining, Jul. 2002. Edmonton, Alberta, Canada, [online], Jul. 2002, [retrieved on Apr. 8, 2004]. Retrieved from the Internet: <URL: http://graphics.stanford.edu/papers/polaris_olap/paper.pdf>. 10 pages.

Sifer, M., "A Visual Interface Technique for Exploring OLAP Data with Coordinated Dimension Hierarchies," [online], Proceedings of the Twelfth International Conference on Information and Knowledge Management, New Orleans, LA, USA, pp. 532-535, Nov. 3-8, 2003, [retrieved on Apr. 8, 2004]. Retrieved from: ACM Digital Library.

Maniatis, A., et al., "Advanced Visualization for OLAP," [online], Data Warehousing and OLAP, Proceedings of the 6th ACM International Workshop on Data Warehousing and OLAP, New Orleans, Louisiana, USA, pp. 9-16, DOLAP, Nov. 7, 2003, [retrieved on Apr. 8, 2004]. Retrieved from the Internet: <URL: http://www.cs.uoi.gr/~pvassil/publications/2003_DOLAP/dolap03.pdf>.

Bito, Y., et al., "Interactively Visualizing Data Warehouse," [online], 2001, [retrieved on Apr. 8, 2004]. Retrieved from the Internet: <URL: http://www.himss.org/content/files/jhim/15-2/him15206.pdf>. Journal of Healthcare Information Management, vol. 15, No. 2, Summer 2001, pp. 133-142.

Sapia, C., et al., "Extending the E/R Model for the Multidimensional Paradigm," [online], 1998, [retrieved on Apr. 7, 2004]. Retrieved from the Internet: <URL: http://www.fing.edu.uy/inco/grupos/csi/esp/Cursos/cursos_act/2003/DAP_Sist DW/Material/sap99a.pdf>. 12 pages.

Porkorný, J., et al. "A Conceptual Modelling Perspective for Data Warehouses," [online], 1999, [retrieved on Apr. 8, 2004]. Retrieved from the Internet: <URL: http://wi99.iwi.uni-sb.de/teilnehmer/pdf-files/EF_32_WiB082.pdf>. pp. 666-684.

Rai et al., Data Mining, Multidimensional Databases, OLAP (Online Analytical Processing), & Data Warehousing, [online], 2001, [retrieved on Apr. 8, 2004]. Retrieved from the Internet: <URL: http://www.cis.gsu.edu/~dstraub/JMBA/MBA8473/2001/DataMine3-2ups.pdf>. pp. 1-39.

Stewart, H. M., "OLAP/EIS Tops Off the Data Warehouse," [online] 1995, [retrieved on Apr. 8, 2004]. Retrieved from the Internet: <URL: http://www.educause.edu/ir/library/pdf/CNC9504.pdf>. pp. 1-16.

"Siggraph Computer Graphics Newsletter—New Visualization Techniques," [online], Feb. 2000, [retrieved on Apr. 8, 2004]. Retrieved from the Internet: <URL: http://www.siggraph.org/publications/newsletter/v34nl/contributions/Eick.html>. 11 pages.

"Prism—from Math World," [online], © 1999 CRC Press LLC, © 1999-2004 Wolfram Research, Inc., [retrieved on Jun. 6, 2004]. Retrieved from the Internet: <URL: http://mathworld.wolfram.com/Prism.html>. 5 pages.

"Polyhedron—from MathWorld," © CRC Press LLC, © 1999-2004 Wolfram Research, Inc., [retrieved on Jun. 6, 2004]. Retrieved from the Internet: <URL: http://mathworld.wolfram.com/Polyhedron.html>. 5 pages.

"Triangular Prism—from Math World," © 1999-2004 Wolfram Research, Inc., [retrieved on Jun. 6 2006]. Retrieved from the Internet: <URL: http://mathworld.wolfram.com/TriangularPrism.html>. 2 pages.

"Hexagonal Prism—from Math World," © 1999-2004 Wolfram Research, Inc., [retrieved on Jun. 6, 2004]. Retrieved from the Internet: <URL: http://mathworld.wolfram.com/HexagonalPrism.html>. 2 pages.

Hyperion Solutions Corp., © 1998. "Providing OLAP to User-Analysts: An IT Mandate," by E.F. Codd & Associates, pp. 1-22, [online] [retrieved on Oct. 8, 2002]. Retrieved from: <URL: http://www.hyperion.com/downloads/olap_to_useranalysts_wp.pdf>.

Business Intelligence, Ltd., © 2002, "The OLAP Report: What is OLAP?," by N.Pendse, pp. 1-7, [online] [retrieved on Oct. 8, 2002]. Retrieved from: <URL: http://www.olapreport.com/fasmi>.

Microsoft Corp. & Hyperion Solutions Corp., "XML for Analysis Specification," Version 1.0, Updated on Apr. 24, 2001, pp. 1-107, [online] [retrieved on Oct. 8, 2002]. Retrieved from <URL: http://www.essbase.com/downloads/XML_Analysis_spec.pdf>.

W3C® (MIT,INRIA, Keio), © 1999. "XML Path Language (Xpath)," Version 1.0, W3C Recommendation Nov. 16, 1999, pp. 1-37, [online] [retrieved on Oct. 8, 2002]. Retrieved from: <URL: http://www.w3/prg/TR/xpath>.

Colossi, N.; Malloy, W; and Reinwald, B., "Relational Extensions for OLAP," IBM Systems Journal, vol. 41, No. 4, 2002, pp. 714-731.

ACM Digital Library, 1998, "Simultaneous Optmization and Evaluation of Multiple Dimensional Queries," by Y. Zhao, P.M. Deshpande, J.F. Naughton and A. Shukla, SIGMOD Record, vol. 27, No. 2, pp. 271-282, Jun. 1998.

ACM Digital Library, 1998, "An Alternative Storage Organization for ROLAP Aggregate Views Based on Cubetrees," by Y. Kotidis and N. Roussopoulos, SIGMOD Record, vol. 27, No. 2, pp. 249-258.

ACM Digital Library, 1998, "Requirement-Based Data Cube Schema Design," by D. Cheung, B. Zhou, B. Kao, H. Lu, T.W. Lam and H.F. Ting, Department of Computer Science and Information Systems, University of Hong King, pp. 162-169.

ACM Digital Library, 1999, "High Performance Multidimensional Analysis of Large Datasets," by S. Goil and A. Choudhary. Center for Parallel and Distributed Computing, Department of Electrical and Computer Engineering, Northwestern University, DOLAP '98, Washington DC, USA, pp. 34-39.

"Towards the Building of a Dense-Region-Based OLAP System," by D.W. Cheung, B. Zhou, B. Kao, K. Hu and S.D. Lee, Department of Computer Science and Information Systems; Hong Kong Univ., China. Data and Knowledge Engineering, vol. 36, No. 1, pp. 1-30, Jan. 2001.

Abstract, "ScanChunk: An Efficient Algorithm for Hunting Dense Regions in Data Cube," by B. Zhou. Department of Computer Science and Engineering, Hangzhou, China, Chinese Journal of Computers, vol. 22, No. 6, pp. 620-626, Jun. 1999, Science Press.

Nippl, C. and Mitschang, B., "TOPAZ: A Cost-Based, Rule-Driven, Multi-Phase Parallelizer," Proceedings of the Twenty-Fourth International Conference on Very-Large Databases, pp. 251-262, 1998. San Francisco: Morgan Kaufmann Publishers, Inc.

Albrecht, J., et al., "Query Optimization by Using Derivability In A Data Warehouse Environment," Data Warehousing And OLAP Archive, Proceedings of the Third ACM International Workshop On Data Warehousing and OLAP, 2000, 11/00, McLean, VA, USA. pp. 49-56.

Pederson D., et al., "A Powerful and SQL-Compatible Data Model and Query Language for OLAP," Thirteenth Australian Database Conference (ADC2002), Melbourne, Australia, Conferences in Research and Practice in Information Technology, vol. 5, © 2002, pp. 121-130.

Colliat, G., "OLAP, Relational, and Multidimensional Database Systems", SIGMOD, vol. 25, No. 3, Sep. 1996, pp. 64-69.

Amendment and Request for Preparation of International Preliminary Examination Report in PCT International Application No. PCT International Application No. PCT/GB2003/005490, filed Mar. 31, 2005 <3 pages>.
Gray, J., S. Chaudhuri, A. Layman, D. Reichart, M. Venkatrao, F. Pellow, & H. Pirahesh, "Data Cube: A Relational Aggregation Operator Generalizing Group-By, Cross-Tab, and Sub-Totals", Journal of Data Mining and Knowledge Discover, 1997, pp. 29-53.
Mangisengi, O., A.M. Tjoa, & R.R. Wagner, "Metadata Management Concept for Multidimensional OLAP Data Based on Object-Oriented Concepts", Proceedings of the First International Conference on Web Information Systems Engineering, Jun. 2000, pp. 358-365.
PCT International Preliminary Examination Report for International Application No. PCT/GB03/05490, issued Apr. 22, 2005. <11 pages>.
PCT International Search Report for International Application No. PCT/GB03/05490, issued Apr. 16, 2004. <5 pages>.
PCT Written Opinion for International Application No. PCT/GB03/05490, issued Sep. 6, 2004. <7 pages>.
Raphaely, D., M. Cyran, J. Gibb, V. Krishnamurthy, M. Krishnaprasad, J. Melnick, R. Smith, & R. Urbano, "Oracle8i Application Developer's Guide—Fundamentals", Release 8.1.5, Feb. 1999, pp. 20-1 to 20-22.
Reply to Written Opinion in PCT International Application No. PCT/GB03/05490, filed Nov. 24, 2004 <4 pages>.
Schwarz, H., R. Wagner, & B. Mitschang, "Improving the Processing of Decision Support Queries: The Case for a DSS Optimizer", Proceedings of the International Database Engineering and Applications Symposium, Jul. 2001, pp. 177-186.
Stohr, T., R. Muller, & E. Rahm, "An Integrative and Uniform Model for Metadata Management in Data Warehousing Environments", Proceedings of the International Workshop on Design and Management of Data Warehouse, Jun. 1999, pp. 12-1 to 12-16.
Goil, et al. "Parallel Scalable Infrastructure for OLAP and Data Mining", Northwestern University, 1999, 9 pp.
Hedberg, S.R., "Parallelism Speeds Data Mining," IEEE Parallel & Distributed Technology, Winter 1995, pp. 3-6.
IBM Corporation, "IBM QMF for Windows for DB2 Workstation Databases, V7.2-Business Intelligence Starts Here!" IBM Software Annoucement, February 26, 2002, 6 pp.
IBM Corporation, "QMF High Performance Option User's Guide for z/OS and OS/390", IBM Query Management Facility, Version 7 Release 2, SC27-0724-01, 2nd ed. Mar. 2002; pp. i-x and 1-338.
Lumpkin, et al. "Query Optimization in Oracle9i", Oracle White Paper, Feb. 2002, 30 pp.
Oracle Corporation, "Oracle9i OLAP Services: Concepts and Administration Guide, Release 1 (9.0.1)", Jun. 2001, A88755-01, pp. i through Index <126 pages>.
Pires, et al., "Database Query Optimizer with Rule Based Search Engine", SugerloafPLoP 2002 Proceedings, pp. 5-20.
Shukla, et al., "Materialized View Selection for Multi-cube Data Models", Proceedings of the 7the International Conference on Extending Database Technology, Mar. 2000, pp. 269-284.
Toyama, M. "SuperSQL: An Extended SQL for Database Publishing and Presentation," Proc. 1998 ACM SIGMOD, Jun. 1-4, 1998, vol. 27, No. 2; 6 pp.
U.S. Appl. No. 09/602,490, filed Jun. 23, 2000; Kraft et al; 48 pages.
Warshaw, et al. "Rule-Based Query Optimization, Revisited," 8th Intl. Conf. Information Knowledge Management CIKM'99; Nov. 2-6, 1999; pp. 267-275.
Alcorn, M.H., "Seeing is Believing", DB2 Magazine, Quarter 1, 2004, vol. 9, Iss. 1, [online], [retrieved on Jun. 28, 2007], retrieved from the internet at <URL: http://www.db2mag.com/shared/printableArticle/jhtml?articleID=17602307>, 15 pp.
Oracle, "Chapter 4: Discovering the Available Metadata,"Oracle OLAP Developer's Guide to the OLAP API 10g Release 1 (10.1), [online], 2003, [Retrieved on Jun. 28, 2007], retrieved from the internet at <URL:http://www.stanford.edu/deptiss/docs/oracle/10g/olap.101/b10335/discover/htm>, 16 pp.
Poole, J.D., "Model_Driven Architecture: Vision, Standards and Emerging Technologies", ECOOP 2001, Apr. 2001, 15 pp.
Andres, F., M Noureddine, K. Ono and A. Zhang, "Metadata Model, Resource Discovery, and Querying on Large Scale Multidimensional Datasets- The GEREQ Project", Proceedings 2000 Kyoto International Conference on Digital Libraries: Research and Practice, 2000, pp. 312-319.
Colossi, N., W. Malloy, and B. Reinwald, "Relational extensions for OLAP", IBM Systems Journal, vol. 41, No. 4, 2002, pp. 714-731.
Huynh, T.N., O. Mangisengi, A.M., Tjoa, "Metadata for Object-Relational Data Warehouse", Proceedings of the International Workshop on Design and Management and Data Warehouses, Jun. 2000, 9 pp.
Mullins, C.S., "Get Your Business Where it Needs to Go", [online], 2003, [Retrieved on Jan. 29, 2008], retrieved from the Internet at <URL: http://www.craigmullins.com/db2infra.htm>, 4 pp.
Oracle, "Oracle OLAP Analytic Workspace Java API Reference", [online], 2003, [Retrieved on Jan. 29, 2008], retrieved from the internet at <URL: http://www.acs.ilstu.edu/docs/oracle/olap.101/b12180/overview-summary.html>, 4 pp.
Poelman, J., "How to Build a Metadata Bridge for DB2 Cube Views", [online], May 2003, {Retrieved on Jan. 29, 2008], retrieved from the Internet at <URL: http://www.ibm.com/developerworks/db2/library/techarticle/0305poelman/0305poelman.h . . . >, 15 pp.
SAP America Inc. "Multi-Dimensional Modeling with BW", SAP America white paper, 2000, pp. 1-68.
U.S. Appl. No. 11/971,157, filed on Jan. 8, 2008, entitled "Systems and Computer Program Products to Browse Database Query Information", invented by C. Andersch, M.L. Coates, and G. Saueressig, 28 pp.
Final Office Action for U.S. Appl. No. 10/410,793, mailed on Apr. 24, 2008 <19 pages>.
Non-Final Office Action for U.S. Appl. No. 10/410,793, mailed on Oct. 19, 2007 <18 pages>.
Final Office Action for U.S. Appl. No. 10/410,793, mailed on Mar. 27, 2007 <23 pages>.
Non-Final Office Action for U.S. Appl. No. 10/410,793, mailed on Sep. 19, 2006 <25 pages>.
Final Office Action for U.S. Appl. No. 10/410,793, mailed on Mar. 2, 2006 <20 pages>.
Non-Final Office Action for U.S. Appl. No. 10/410,793, mailed on Sep. 20, 2005 <20 pages>.
Notice of Allowance for U.S. Appl. No. 10/325,245, mailed on Aug. 22, 2006 <4 pages>.
Response to Office Action for U.S. Appl. No. 10/325,245 dated Jun. 12, 2006 <9 pages>.
Non-Final Office Action for U.S. Appl. No. 10/325,245 mailed Mar. 10, 2006 <7 pages>.
Non-Final Office Action for U.S. Appl. No. 10/874,397 mailed Apr. 7, 2008 <22 pages>.
Non-Final Office Action for U.S. Appl. No. 10/874,397 mailed Oct. 4, 2007 <25 pages>.
Non-Final Office Action for U.S. Appl. No. 10/874,397 mailed Mar. 14, 2007 <16 pages>.
Chen, Q., "Mining Exceptions and Quantitative Association Rules in OLAP Data Cube", Master Thesis, Jul. 1999, 113 pp.
Hammer, J. & L. FU, "CubiST++: Evaluating Ad-Hoc Cube Queries Using Statistics Trees", Distributed and Parallel Databases, vol. 14, No. 3, 2003, pp. 221-254.
Hess, T.J. & J.D. Wells, "Understanding How Metadata and Explanations Can Better Support Data Warehousing and Related Decision Support Systems: An Exploratory Case Study", Proceedings of the 35th Hawaii International Conference on System Sciences, 2002, 10 pp.
Schwarz, H., R. Wagner, & B. Mitschang, "Improving the Processing of Decision Support Queries: The Case for a DSS Optimizer", Proceedings of the 2001 International Database Engieering and Applications Symposium, 2001, pp. 177-186.

* cited by examiner

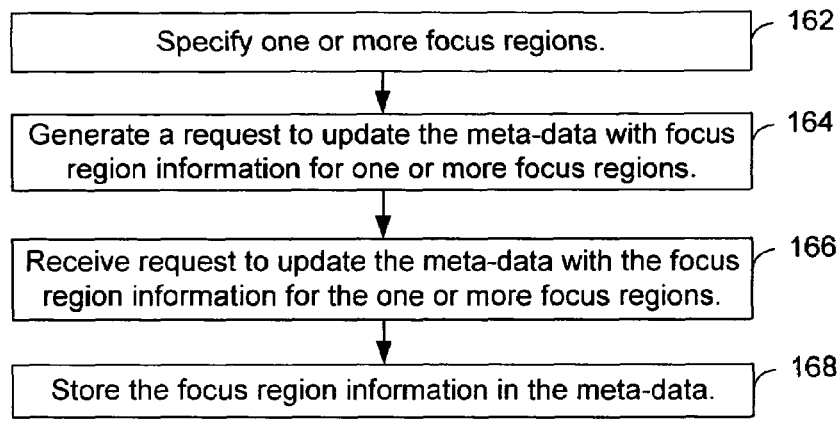
Figure 4
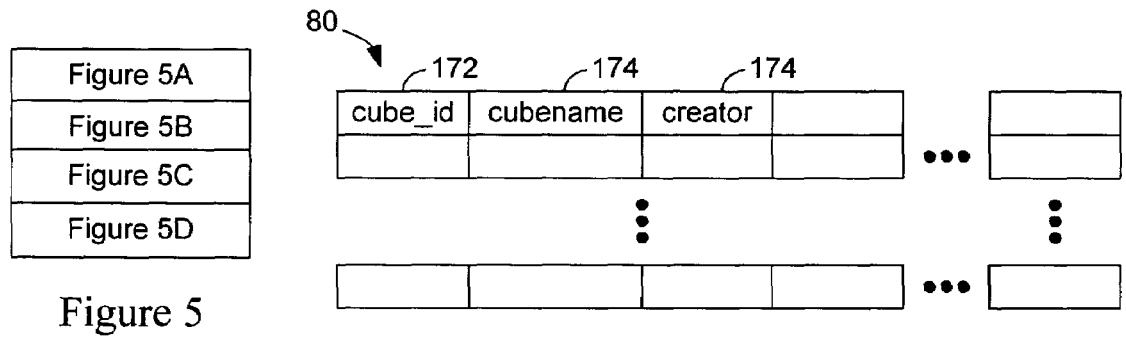
Figure 5
Figure 5A
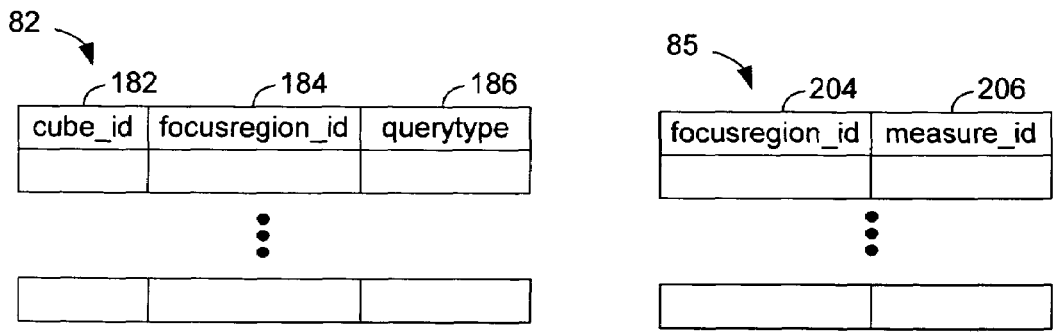
Figure 5B
Figure 5D
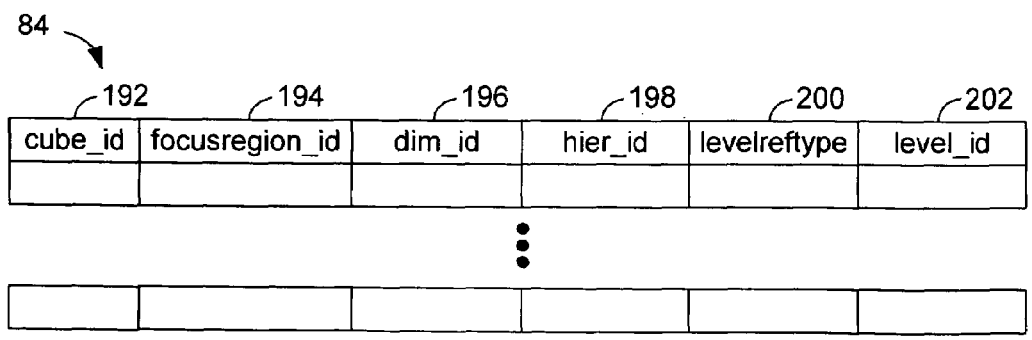
Figure 5C

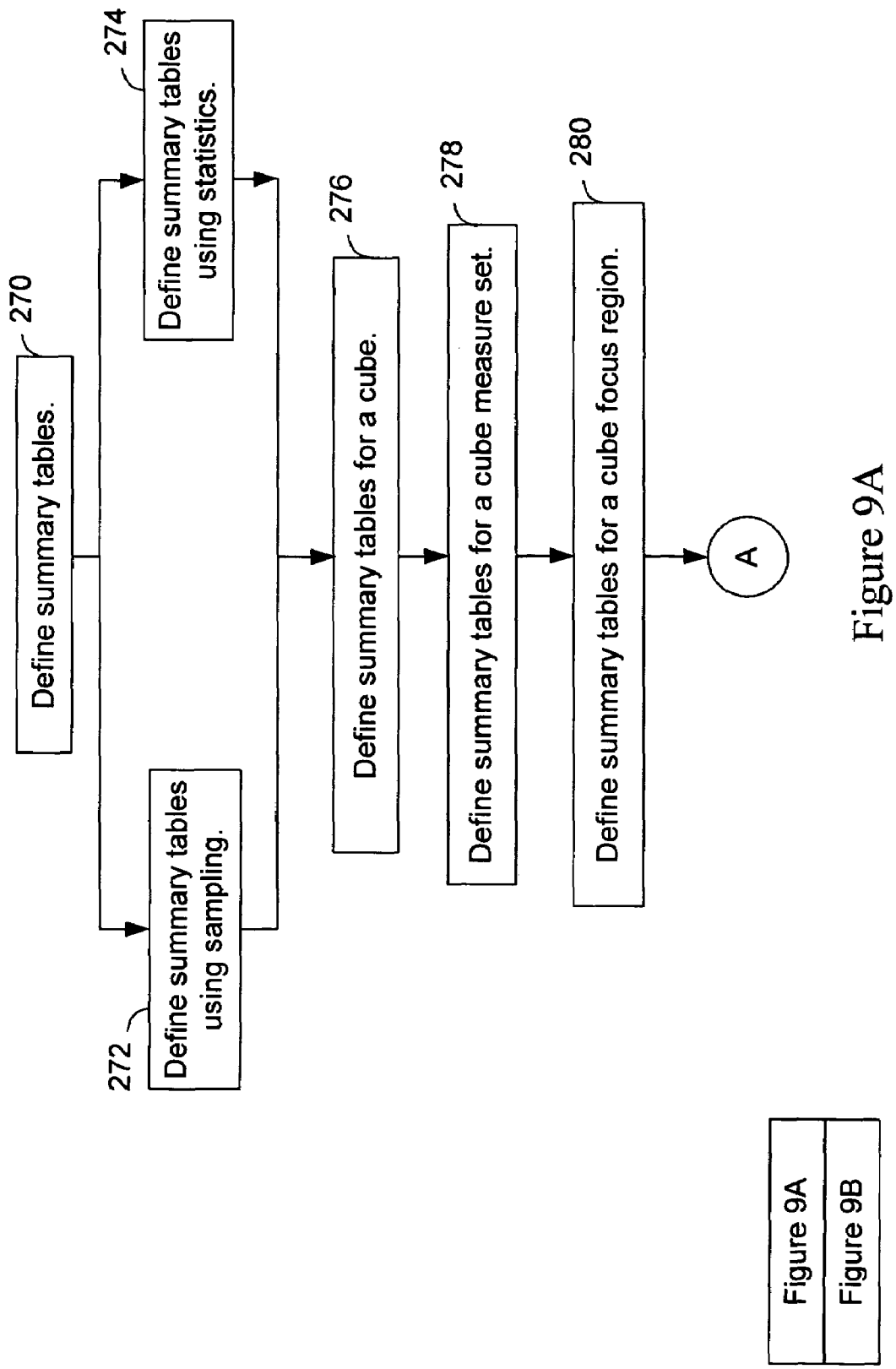

MODEL BASED OPTIMIZATION WITH FOCUS REGIONS

CROSS-REFERENCE TO RELATED APPLICATIONS

In co-pending U.S. application Ser. No. 10/874,397, entitled "Visualizing and Manipulating Multidimensional OLAP Models Graphically," filed on the same date herewith, by Nathan Gevaerd Colossi, Daniel Martin DeKimpe, Suzanna Khatchatrian, Craig Reginald Tomlyn, and Wei Zhou, International Business Machines Corporation (IBM), assigned to the assignee of the present invention, and incorporated herein by reference in its entirety, various embodiments of a graphical user interface for specifying optimization slices are described. Although not limited thereto, some embodiments of the present invention employ various embodiments of the graphical user interface for specifying optimization slices.

In co-pending U.S. application Ser. No. 10/410,793, entitled "Method, System, and Program for Improving Performance of Database Queries," filed Apr. 9, 2003, by Nathan Gevaerd Colossi, Daniel Martin DeKimpe, Jason Dere and Steven Sit, assigned to the assignee of the present invention, and incorporated herein by reference in its entirety, various embodiments of heuristics to reduce the number of candidate slices and various embodiments of rating slices are described. Although not limited thereto, some embodiments of the present invention employ various embodiments of heuristics to reduce the number of candidate slices, and some embodiments employ various embodiments of rating slices.

BACKGROUND OF THE INVENTION

1 Field of the Invention

This invention relates generally to online analytical processing (OLAP) systems and more particularly to model based optimization with focus regions in an OLAP system.

2 Description of the Related Art

Online analytical processing (OLAP) systems are typically used to access and analyze business data. Business data typically comprises sales, product and financial data over various time periods. Using an OLAP system, an analyst can explore business results interactively. A dimension is a collection of related attributes of the data values of the OLAP system, for example, product, market, time, channel, scenario and customer. OLAP systems are typically multidimensional. To understand their businesses, business analysts frequently work with data which is aggregated across various business dimensions. This provides analysts with the ability to explore business information in context, for example, sales by product by customer by time, or defects by manufacturing plant by time.

In an OLAP system, dimensional models allow business analysts to interactively explore information across multiple viewpoints at multiple levels of aggregation, also referred to as levels. A dimension typically comprises many levels, and the levels are typically hierarchical. The business data is typically aggregated across various dimensions at various levels to provide different views of the data at different levels of aggregation. The data may be aggregated over various periods of time, by geography, by teams and by product, depending on the type and organization of the business. Aggregated data is commonly referred to as an aggregation. For example, an aggregation may comprise the sales data for the month of July for a specified product.

Business analysts issue queries to retrieve business data and may request aggregations at various levels. If the aggregations are not available, then the aggregations will be computed. Computing aggregations can take a large amount of time and query processing may be slow.

Various OLAP systems store pre-computed aggregations to improve the performance of query processing. However, OLAP systems typically have a limited amount of storage space and cannot store all possible aggregations.

Some OLAP systems employ performance advisors to make recommendations as to what aggregations to pre-compute for improving the performance of queries. Model based performance advisors make the recommendations based on meta-data that describes the system. Workload-based performance advisors make recommendations based on query workloads that are provided.

One advantage of a model based performance advisor is the ability to make recommendations at the time the model is defined rather than waiting for a history of queries to develop. In addition, optimization can be performed for the complete model rather than incrementally changing the recommendations as query workload histories are developed. If the model is extended, that is, if the model is changed, a model based performance advisor can immediately make appropriate recommendations to reflect the changes.

Workload-based performance advisors typically require that users provide query workloads that represent the overall system usage. In practice, this can be difficult. Even if the query workload is generated by capturing the actual queries being executed, there is a risk that a new pattern of queries will develop. The new pattern of queries may result from a change to the meta-data model or from a change in usage because the needs of the business changed. For a workload-based performance advisor, the user typically waits for a new query history to develop before appropriate recommendations can be made to reflect the changes. One advantage of workload-based performance advisors is that the workload-based performance advisors will only optimize the portion of the model that is actually being used.

One disadvantage to the model based performance advisor is that it may not be practical to optimize for the entire model. For large, complex models, it can be prohibitively expensive to optimize the entire model.

Therefore, there is a need for a technique to provide an improved model based performance advisor. This technique should allow the model based performance advisor to optimize portions of the model.

SUMMARY OF THE INVENTION

To overcome the limitations in the prior art described above, and to overcome other limitations that will become apparent upon reading and understanding the present specification, various embodiments of a method, system and computer program product for optimization in a model based performance advisor for a multidimensional model are disclosed.

In various embodiments, the multidimensional model comprises levels, and the levels are organized into groups. Each group has one or more levels. One or more recommended slices associated with the groups are determined based on, at least in part, a focus region.

In some embodiments, a user specifies the focus region. In various embodiments, the focus region comprises one level from each group of the first subset of groups. In other embodiments, the focus region comprises one or more levels from each group.

In this way, an improved technique for optimizing in a model based performance advisor has been provided. Using focus regions, the model based performance advisor can optimize portions of the multidimensional model.

BRIEF DESCRIPTION OF THE DRAWINGS

The teachings of the present invention can be readily understood by considering the following description in conjunction with the accompanying drawings, in which:

FIG. 4 depicts a flowchart of an embodiment of specifying a focus region and storing information associated with the focus region as meta-data;

FIG. 5 is comprised of FIGS. 5A, 5B, 5C and 5D which depict embodiments of a cube table, a cube-to-focus-region table, a focus-region-level table and a focus-measure table, respectively, of the meta-data of FIG. 1;

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized for optimization in a model based performance advisor. In various embodiments, a multidimensional model comprises groups. Each group has one or more levels. One or more recommended slices associated with the groups of the multidimensional model are determined based on a focus region.

In various embodiments, the multidimensional model is a cube model, and in some embodiments, the multidimensional model is a cube of the cube model. In other embodiments, the multidimensional model refers to a metaoutline; and in some embodiments, a universe. However, the present invention is not meant to be limited to a cube model, cube, metaoutline and universe and may be used with other types of multidimensional models.

In some embodiments, a group is a dimension. In other embodiments, a group is a hierarchy. In yet other embodiments, a group comprises a dimension and at least one hierarchy within the dimension.

In various embodiments, a focus region is associated with at least a portion of the multidimensional model, and influences the determination of recommended slices in the model based performance advisor.

Figure 1:
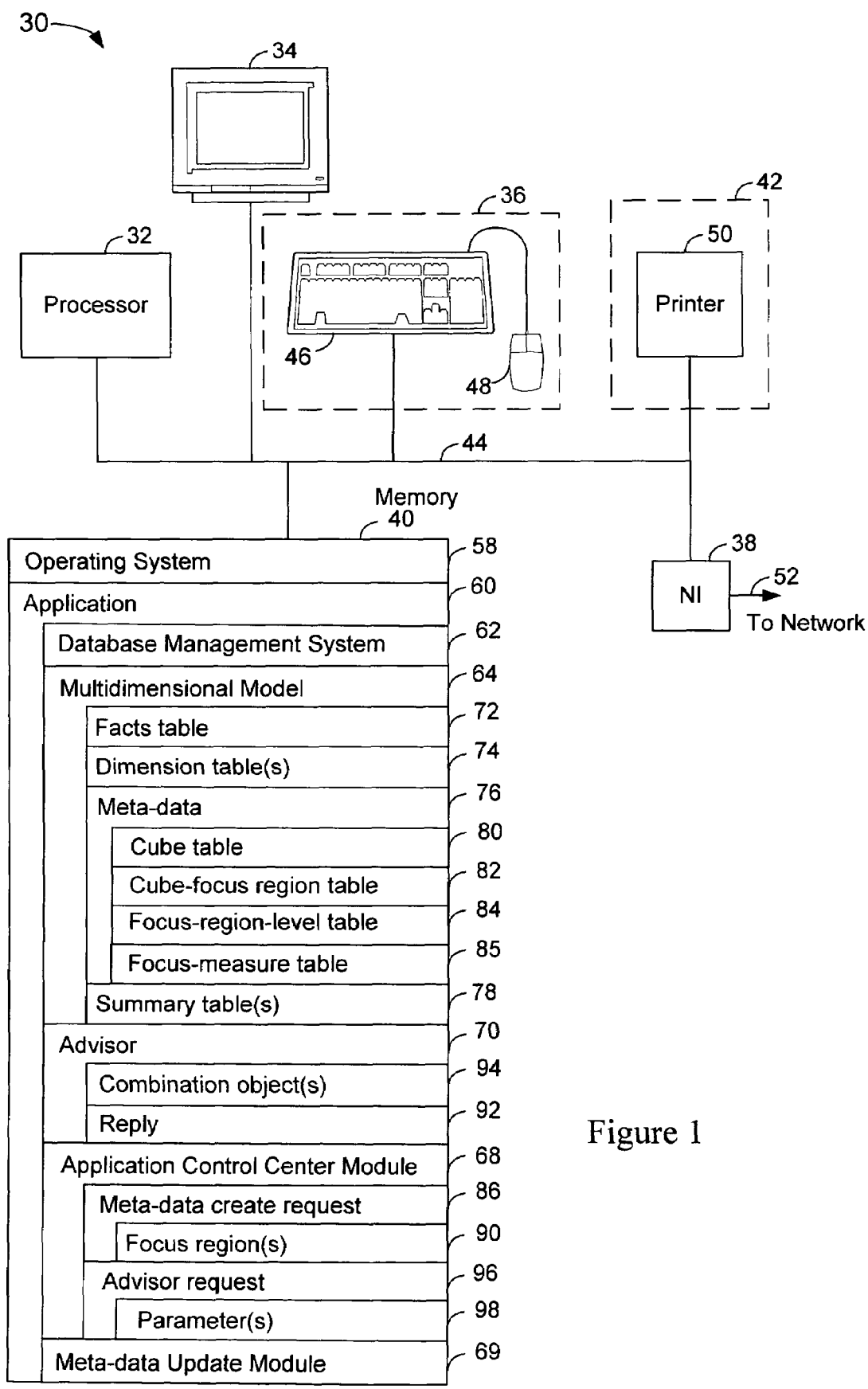
FIG. 1 depicts an illustrative computer system which uses various embodiments of the present invention.

FIG. 1 depicts an illustrative computer system which uses various embodiments of the present invention. The computer system 30 comprises a processor 32, display 34, input interfaces (I/F) 36, communications interface 38, memory 40 and output interface(s) 42, all conventionally coupled by one or more buses 44. The input interfaces 36 comprise a keyboard 46 and a mouse 48. The output interface 42 comprises a printer 50. The communications interface 38 is a network interface (NI) that allows the computer 30 to communicate via a network, such as the Internet. The communications interface 38 may be coupled to a transmission medium 52 such as, a network transmission line, for example twisted pair, coaxial cable or fiber optic cable. In another embodiment, the communications interface 38 provides a wireless interface, that is, the communications interface 38 uses a wireless transmission medium.

The memory 40 generally comprises different modalities, illustratively semiconductor memory, such as random access memory (RAM), and disk drives. In some embodiments, the memory 40 stores an operating system 58 and an application 60. The application 60 is typically an OLAP application. The application 60 typically comprises a database management system 62, a multidimensional model 64, an application control center module 68, a meta-data update module 69 and an advisor 70. In various embodiments, the database management system 62 is the IBM DB2® (Registered trademark of International Business Machines Corporation) database management system. However, the present invention is not meant to be limited to the IBM DB2 database management system and can be used with other database management systems.

The advisor 70 is a model based performance advisor which provides recommendations regarding which aggregations to pre-compute. In various embodiments, the advisor 70 recommends one or more slices for which aggregations may be pre-computed. In various embodiments, the recommendations comprise one or more recommended slices for one or more measures. Aggregations may be generated, that is pre-computed, based on the recommended slices. In some embodiments, the advisor 70 provides recommendations regarding summary tables.

The multidimensional model 64 typically comprises a facts table 72, one or more dimension tables 74, meta-data 76 and summary tables 78. In various embodiments, the meta-data 76 comprises a cube table 80, a cube-focus region table 82, a focus-region-level table 84 and a focus-measure table 85. Although various embodiments will be described with respect to storing meta-data in tables, in other embodiments, other objects may be used to store the meta-data. The facts table 72, dimension tables 74 and meta-data 76 will be described in further detail below.

The summary tables 78 store pre-computed aggregations so that the data may be accessed quickly. Although various embodiments will be described with respect to summary tables, in other embodiments, other objects to store pre-computed aggregations may be used.

The application control center module 68 allows a user to specify one or more focus regions 90. In various embodiments, the application control center module 68 provides a graphical user interface to communicate with a user. In some embodiments, the application control center module 68 communicates with the meta-data update module 69 by sending a meta-data create request 86 comprising the focus region(s) 90. The application control center module 68 communicates with the advisor 70 by sending an advisor request 96 and receiving a reply 92. The user can specify various parameters 98 of the advisor request 96 using the graphical user interface. In various embodiments, the advisor 70 comprises one or more combination objects 94 which store a representation of one or more focus regions 90, respectively.

In some embodiments, the multidimensional model 64 may be remotely located from the application 60 on another computer system and accessed via the network interface 38 and network. In some other embodiments, the application control center module 68 may be remotely located from the database management system 62, multidimensional model 64, advisor 70 and meta-data update module 69, on another computer system and accessed via the network interface 38 and network. Typically, the advisor 70 is on the same computer system as the database management system 62, multidimensional model 64 and meta-data update module 69.

In various embodiments, the specific software instructions, data structures and data that implement various embodiments of the present inventive technique are typically incorporated in the advisor 70 and in some embodiments, the application control center module 68, the meta-data create request 86, the meta-data update module 69, the meta-data 76 and the advisor request 96. Generally, an embodiment of the present invention is tangibly embodied in a computer-readable medium, for example, the memory 40 and is comprised of instructions which, when executed by the processor 32, cause the computer system 30 to utilize the present invention. The memory 40 may store the software instructions, data structures and data for any of the operating system 58, application 60, and multidimensional model 64, in semiconductor memory, in disk memory, or a combination thereof.

The operating system 58 may be implemented by any conventional operating system, such as z/OS® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

A cube model is one type of multidimensional model. The cube model represents a particular grouping and configuration of relational tables. Typically a cube model is built in a star schema configuration. The cube model contains meta-data objects that describe relationships in the data in the relational tables. In various embodiments, in a star schema configuration, the cube model has a central facts object or table. The facts object contains one or more measures. The following are exemplary measures: sales revenue, sales volume, cost of goods sold, and profit. Hierarchies store information about how the levels within a dimension are related to each other and are structured. A hierarchy can be used to calculate and navigate across a dimension. Each dimension has one or more hierarchies that contain levels with sets of related attributes. A join is created to connect each dimension to the facts object.

A cube is a subset of a cube model. A cube comprises a specific set of meta-data objects derived from the cube model, such as cube dimensions, cube hierarchies, cube levels and a cube facts objects. A cube model may have zero or more cubes. Although various embodiments of the present invention will be described with respect to a cube model and a cube, the present invention is not meant to be limited to a cube model and cube and may be used with other types of multidimensional models.

The measures may be distributive or non-distributive. For distributive measures or data, higher level aggregations may be computed from lower level aggregations. For example, annual sales volume may be computed as the sum of the monthly sales volume for twelve months, rather than from base data which may store individual sales at the daily level. For non-distributive measures or data, the levels of aggregations are computed from the lowest or base level data, and cannot be computed from lower level aggregations. For example, non-distributive measures, such as count distinct, are calculated directly from the base data and cannot be computed based on aggregations from one level to the next level.

Figure 2:
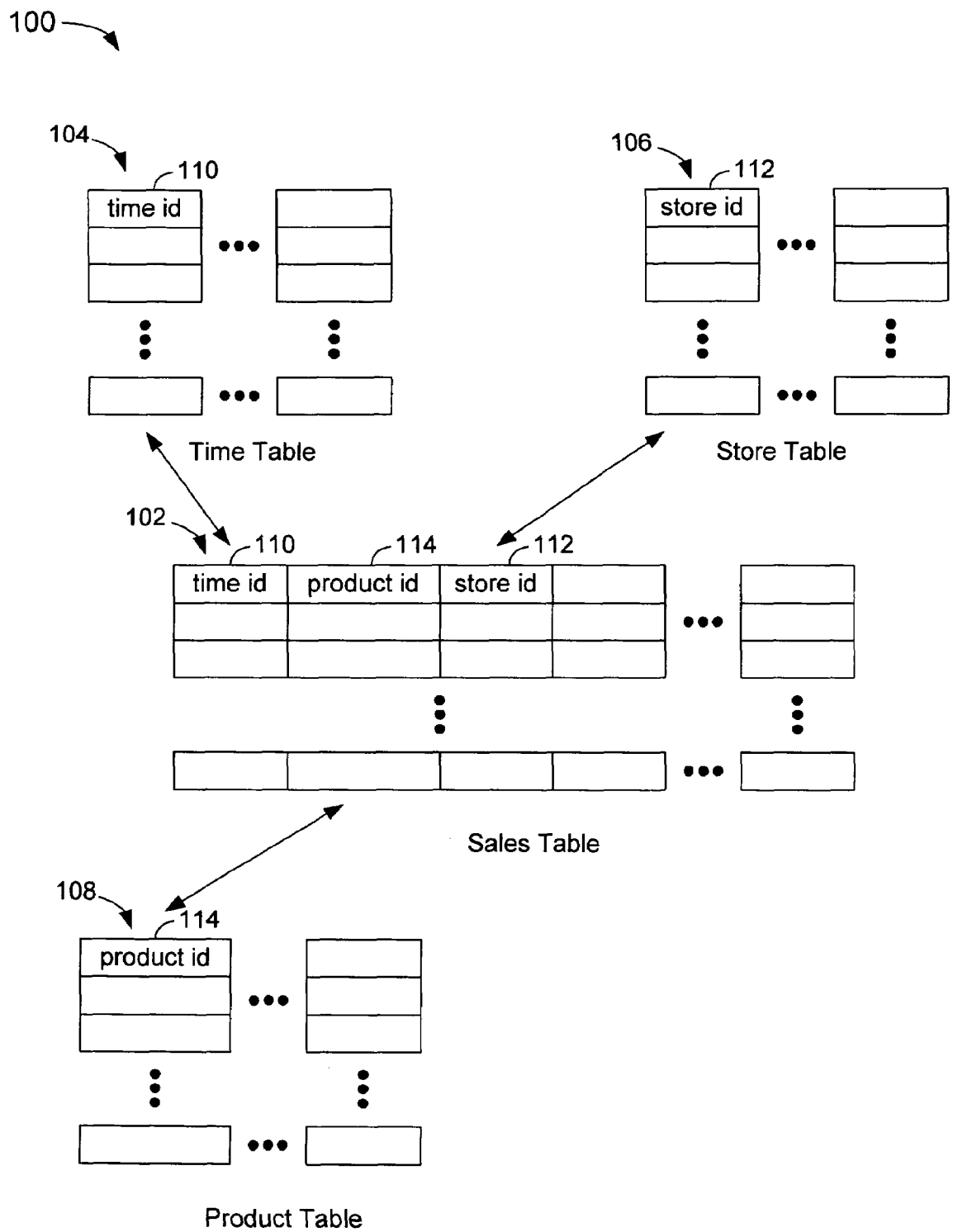
FIG. 2 depicts an exemplary star schema implementation of a multidimensional model.

FIG. 2 depicts an exemplary star schema implementation of a multidimensional model 100. In some embodiments, the multidimensional model 100 is a cube model; and, in other embodiments, the multidimensional model 100 is a cube. In this example, the multidimensional model has three dimensions, time, store and product, and one measure, sales. The sales data is stored in a central facts table 102. The time, store and product tables 104, 106 and 108, respectively, store additional data that is associated with the sales data in the facts table 102. For example, the store table 106 may store information identifying each store associated with the sales data, such as the name and location of the store. The time table 104 may store information associated with the timing of the sales data such as day, month and year. The product table 108 may store information describing the products sold. In the star schema, the time, store and product tables 104, 106 and 108, respectively, are joined to the facts table 102 based on a time identifier (id) 110, a product id 114, and a store id 112, respectively.

In various embodiments, meta-data describes the data organization in the dimension and facts tables. The meta-data is typically stored in separate tables. The measures are defined in the meta-data. In some embodiments, the meta-data describes the dimensions and the hierarchies, that is, the relationship of the levels within the dimension. The hierarchy is used to aggregate data for and to navigate a dimension. Each dimension has one or more corresponding hierarchies with defined levels.

Figure 3:
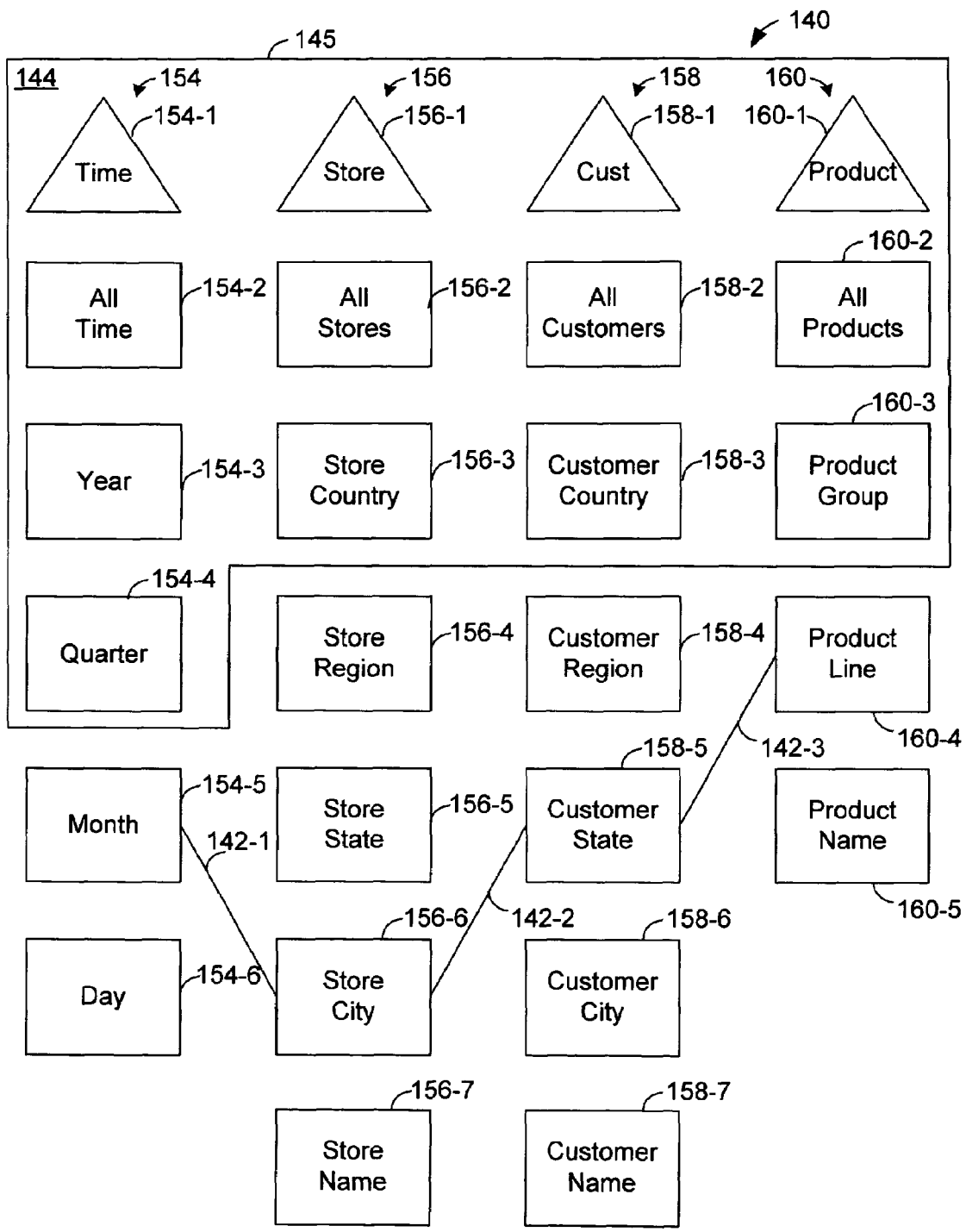
FIG. 3 depicts an exemplary multidimensional model with an exemplary slice and region.

FIG. 3 depicts an exemplary cube 140 with an exemplary slice 142 and region 144. Each column 154, 156, 158 and 160 represents a hierarchy in a dimension. A triangle 154-1, 156-1, 158-1 and 160-1 contains the dimension name. The top block 154-2, 156-2, 158-2 and 160-2 of each column represents a top or "All" level that represents an aggregation of all the base level data of one or more measures for that dimension. The other blocks in the columns, 154-3 to 154-6, 156-3 to 156-7, 158-3 to 158-7, and 160-3 to 160-5, represent levels that were identified from the meta-data. For example, the time dimension has year, quarter, month and day levels, 154-3, 154-4, 154-5 and 154-6, respectively.

The order of the blocks reflects the hierarchy. For distributive data, the order of the blocks also reflects how data may be aggregated. For example, in the time hierarchy 154, distributive daily data can be aggregated to obtain monthly data, monthly data can be aggregated to obtain quarterly data, quarterly data can be aggregated to obtain yearly data, and yearly data can be aggregated to all time data. Typically, the physical or base level data corresponds to the bottom block in each hierarchy, for example, day 154-6, store name 156-7, customer name 158-7 and product name 160-5. The data associated with the other levels is calculated from the base level data.

In various embodiments, the entire multidimensional space can be thought of as a collection of slices where a slice comprises one level from one hierarchy of each dimension of a dimensional model. In the multidimensional model of FIG. 3, there are 720 possible slices. The number of slices is equal to the product of the number of levels in the time dimension (five), the number of levels in the store dimension (six), the number of levels in the customer dimension (six), and the number of levels in the product dimension (four). In FIG. 3, the exemplary slice 142 represents aggregations of the month, store city, customer state and product line levels, 154-5, 156-6, 158-5 and 160-4, respectively, for one or more measures. The slice 142 is represented by three lines 142-1, 142-2 and 142-3 that interconnect the blocks associated with the levels of the slice.

In some embodiments, a region comprises one or more levels from each hierarchy of a set of multiple hierarchies. In other embodiments, a region comprises one or more levels from each dimension of a cube. In FIG. 3, the region 144 comprises the all time, year and quarter levels, 154-2, 154-3 and 154-4, respectively, from the time dimension, the all stores and store country levels, 156-2 and 156-3, respectively, from the store dimension, the all customers and customer country levels, 158-2 and 158-3, respectively, from the customer dimension, and the all products and product group levels, 160-2 and 160-3, respectively, from the product dimension.

A user of an OLAP system typically works with a subset of the multidimensional space. The subset can be a single slice 142 or a collection of slices. Sometimes the region 144, enclosed by a region indicator 145, of contiguous slices is used. The region 144 comprises all possible slices within the region. When a region comprises one level from each dimension, the region is also referred to as a slice.

In FIG. 3, the multidimensional model has one hierarchy per dimension. In other embodiments, a dimension may have multiple hierarchies. These hierarchies may correspond to subsets of the multidimensional model. Alternately, the multidimensional model has only dimensions, with an implicit hierarchy for each dimension. In yet other embodiments, the multidimensional model does not have explicit dimensions, but only has hierarchies that comprise levels; and in various embodiments, the hierarchies are treated as dimensions.

A multidimensional model may have a large number of possible slices. A logical slice does not contain pre-computed aggregated data. A physical slice contains pre-computed aggregated data. Typically, a subset of all the possible slices, including the slice associated with the base level data, are physical slices. The data for the logical slices is aggregated dynamically when a query is executed.

In various embodiments, one or more focus regions are specified and stored in the meta-data. A user sends a request for a recommendation to the advisor with one or more parameters. The advisor produces a recommendation based on, at least in part, the focus regions in the meta-data and the parameters.

FIG. 4 depicts a flowchart of an embodiment of specifying a focus region and storing information associated with the focus region as meta-data. In some embodiments, steps 162 and 164 of the flowchart of FIG. 4 are implemented in the application control center module 68 of FIG. 1; and steps 166 and 168 of the flowchart of FIG. 4 are implemented in the meta-data update module 69 of FIG. 1.

In step 162, one or more focus regions are specified. In some embodiments, a user specifies one or more focus regions using a graphical user interface or an application programming interface. U.S. patent application Ser. No. 10/874,397, filed on the same date herewith, entitled "Visualizing and Manipulating Multidimensional OLAP Models Graphically," to Nathan Gevaerd Colossi, et al., IBM Docket No. SVL920040015US1 describes various embodiments of a graphical user interface for specifying optimization slices. In various embodiments, an optimization slice is a focus region. In some embodiments, the application control center module 68 (FIG. 1) implements various embodiments of a graphical user interface for specifying optimization slices of U.S. patent application Ser. No. 10/874,397, filed on the same date herewith, entitled "Visualizing and Manipulating Multidimensional OLAP Models Graphically," to Nathan Gevaerd Colossi et al., IBM Docket No. SVL920040015US1 to provide a graphical user interface for specifying a focus region and/or displaying a focus region. In another embodiment, one or more focus regions are automatically specified by the application. This embodiment will be described in further detail below with reference to FIG. 16.

In step 164, the application control center module 68 (FIG. 1) generates a request to update the meta-data with focus region information for one or more focus regions. In various embodiments, the request to update the meta-data with focus region information is the meta-data create request 86 of FIG. 1. In step 166, the meta-data update module 69 (FIG. 1) receives the request to update the meta-data with the focus region information for the one or more focus regions. In step 168, the focus region information is stored in the meta-data.

FIGS. 5A, 5B, 5C and 5D depict embodiments of a cube table 80, a cube-to-focus-region table 82, a focus-region-level table 84 and a focus-measure table 85, respectively, to store meta-data, that is, the focus region information. The meta-data update module 69 (FIG. 1) receives the focus region information in the meta-data create request 86 (FIG. 1) and updates the cube-to-focus-region table 82, the focus-regionlevel table 84, and in some embodiments, the focus-measure table 85, with the focus region information in the meta-data create request 86 (FIG. 1).

In FIG. 5A, the cube table 80 comprises a cube identifier (cube_id) 172, a cube name (cubename) 174 and a creator 176. The cube identifier 172 is used to uniquely identify a cube and is also used to join with the cube-to-focus-region table 82 and the focus-region-level table 84. The cube identifier 172 may also reference another table that contains additional information about one or more cubes of the multidimensional model.

In FIG. 5B, the cube-to-focus-region table 82 comprises a cube identifier (cube_id) 182, a focus region identifier (focus-region_id) 184 and a query type (querytype) 186. The focus region identifier has been described above with reference to FIG. 5A. The focus region identifier 184 is used to uniquely identify a focus region and to join to the focus-region-level table 84. The query type 186 stores the specified query type for a focus region and will be described in further detail below.

In FIG. 5C, the focus-region-level table 84 comprises a cube identifier (cube_id) 192, a focus region identifier (focus-region_id) 194, a dimension identifier (dim_id) 196, a hierarchy identifier (hier_id) 198, a level reference type (level-reftype) 200, and a level identifier (level_id) 202. The cube identifier and focus region identifier have been described above with reference to FIGS. 5A and 5B, respectively. The dimension identifier 196 uniquely identifies a dimension and associates a dimension with a focus region. The dimension identifier 196 is used to reference another table comprising dimension information, such as the dimension name. The hierarchy identifier 198 uniquely identifies a hierarchy, and associates a hierarchy with a focus region. The hierarchy identifier 198 is used to reference another table comprising hierarchy information. The level reference type 200 is used to indicate if the level is the "All" level, the "Any" pseudo-level or a defined level. The level identifier (level_id) 202 uniquely identifies a level and associates a level with a focus region. The level identifier 202 is used to reference another table comprising level information such as the level name. A focus region for a cube is associated with multiple rows comprising the dimension identifier, the level identifier, and in some embodiments, the hierarchy identifier.

In FIG. 5D, the focus-measure table 85 comprises a focus region identifier (focusregion_id) 204 and a measure identifier (measure_id) 206. The focus-measure table 85 associates a focus region with one or more measures. The focus region identifier has been described above with reference to FIG. 5B. The measure identifier 206 is used to reference another table comprising information about the measures such as the measure name.

Figure 6:
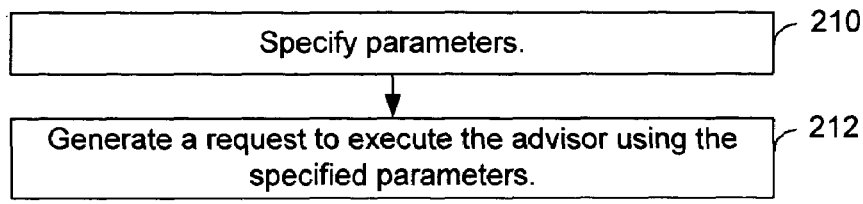
FIG. 6 depicts a high-level flowchart of an embodiment of generating a request to send to the advisor of FIG. 1.

FIG. 6 depicts a high-level flowchart of an embodiment of generating an advisor request to send to the advisor 70 (FIG. 1). In various embodiments, the flowchart of FIG. 6 is implemented in the application control center module 68. In step 210, parameters are specified. In step 212, a request to execute the advisor 70 (FIG. 1) using the specified parameters is generated.

In various embodiments, the advisor 70 (FIG. 1) recommends one or more slices, referred to as recommended slices, for which one or more aggregations may be pre-computed, for one or more measures. In some embodiments, the advisor 70 (FIG. 1) recommends summary tables which store the recommended pre-computed aggregations. The advisor 70 (FIG. 1) creates recommendations based on the parameters, meta-data, statistics and, in some embodiments, sampled data. When the meta-data comprises a focus region, the advisor also uses the focus region information to create recommendations. The parameters comprise at least one and any combination of a cube model to optimize, a table space to store the summary tables in, a table space to store the indexes in, a disk space limitation, a time limitation, an update method, and a refresh method. In some embodiments, when a parameter or focus region is not specified, the advisor 70 (FIG. 1) will provide a parameter or focus region. In various embodiments, the advisor 70 (FIG. 1) returns the recommendations in the response. The recommendations typically comprise one or more recommended slices. In some embodiments, the recommendations comprise SQL instructions, as described in Table 2 below. In various embodiments, the application control center module 68 (FIG. 1) extracts the recommendations from the response, generates a file to build a set of recommended summary tables to store the recommended pre-computed aggregations based on the recommendations, that is, the recommended slice(s), and, in some embodiments, generates a file to update the recommended summary tables.

In some embodiments, the advisor request is implemented using the extensible markup language (XML). In various embodiments, the advisor request comprises at least one or any combination of the parameters in Table 1 below. The parameters have a name, datatype, and value. Table 1 also provides a description for each parameter.

TABLE 1

Advisor Request Parameters

| Name | Datatype | Values | Description |
| --- | --- | --- | --- |
| cubeModelRef | XML element | | Cube model to optimize. |
| tablespaceName | XML string [optional] | | Table space to put the summary tables in. |
| indexspaceName | XML string [optional] | | Table space to put the summary table indexes in. |
| diskspaceLimit | XML double [optional] | | Disk space (in bytes) available for the summary tables and their indexes. Allows users to make tradeoffs between disk space and query performance. Specifying zero means disk space is unlimited and is the default. |
| timeLimit | XML integer [optional] | | The amount of time (in seconds) that may be used to generate recommendations. This allows users to tradeoff time between the optimizing and query performance. In some embodiments, this is useful because at some point the advisor may be unable to generate better recommendations no matter how much time it spends on analysis. Specifying |

TABLE 1-continued

Advisor Request Parameters

| Name | Datatype | Values | Description |
| --- | --- | --- | --- |
| | | | zero means that the amount of time is unlimited and is the default. |
| Sampling | XML string [optional] | yes no | Specifies whether data sampling of the cube model base tables is performed. If sampling is not performed then the advisor will make recommendations using database statistics. Using sampling can improve the recommendations but may increase the time for the advisor to run. In other embodiments, users have a small replica of the original data. The users can adjust the database statistics to make it look like the tables are the same size as the original tables and then specify that sampling should not be done. The advisor will then make recommendations using the statistics. |
| Refresh | XML string [optional] | deferred immediate | Specifies whether the database management system should attempt to refresh the summary tables immediately when the base tables change in order to synchronize the base tables. Refresh deferred means the user specifies when the summary tables are to be refreshed. There are many restrictions when using refresh immediate and the advisor may use deferred even if the user specifies immediate. |

In an alternate embodiment, the advisor request also comprises the focus region information and query type. In this embodiment, the advisor does not retrieve the focus region information and query type from the meta-data.

The focus regions are typically used to specify one or more characteristics of the queries that users frequently issue. A focus region comprises one or more contiguous levels from each dimension, or alternately, hierarchy of the multidimensional model. In various embodiments, the focus region comprises a specific level from one hierarchy of each dimension of the multidimensional model, which is equivalent to a slice. The specific levels can be either the "All" level or any other level defined in the hierarchy or dimension. In some embodiments, an "Any" level may be designated for a hierarchy or dimension. When the "Any" level is specified, the advisor 70 (FIG. 1) will select the level or levels of that hierarchy or dimension when determining the recommended slices, and in some embodiments, summary tables. In another embodiment, a range of contiguous levels may be specified for a hierarchy or dimension in the focus region. The range specifies an upper level and a lower level for the hierarchy or dimension.

One or more focus regions can be used to specify which region of a cube is accessed frequently. In various embodiments, a focus region may comprise at least one or any combination of a specified level, "All", "Any" and a specified range of levels. In some embodiments, a specific level is specified in the focus region if that level is frequently queried. In various embodiments, "All" is specified if the highest level of aggregation of that dimension is frequently queried. In some embodiments, "Any" is specified if no level is significantly more important than any other level in that cube dimension, many levels in that cube dimension are queried, or the frequency of access for each level of a dimension is unknown. In various embodiments, a range of levels is specified if certain levels are accessed more frequently than others. In this way, the optimization process performed by the advisor is focused.

In some embodiments, the number of focus regions per cube is limited to a predetermined number. In other embodiments, there is no limit to the number of focus regions per cube. In various embodiments, when the number of focus regions exceeds a predetermined limit threshold, the advisor optimizes the entire cube. In some embodiments, the entire cube is optimized by specifying the "Any" level for each dimension of the cube. In various embodiments, when the focus regions comprise a large portion of the cube, for example, the fraction of slices or levels specified in the focus region of the total number of slices or levels, respectively, in the cube exceeds a predetermined fractional threshold, the entire cube is optimized.

In various embodiments, the focus region is also associated with an expected query type. In some embodiments, the query type comprises at least one or any combination of the following: drill down, report, MOLAP extract, hybrid (HOLAP) extract and drill through.

Queries may reach any level in the multidimensional model. A drill down query typically accesses a subset of data from a top level. In a drill down query, a user typically drills into the lower levels of one dimension, and the other dimensions remain at the higher levels. When the dimensional model is optimized for drill down queries, performance is typically improved for queries in the upper levels of the dimensional model. Typically, relational OLAP (ROLAP) spreadsheet applications are used to perform drill down queries. In drill down queries, users typically wait for an immediate response.

The drill down query type indicates that users typically drill down to lower levels in the dimensional model. The advisor can optimize for both shallow queries and deep queries in at least a subset of the dimensions. In various embodiments, a user typically specifies a focus region comprising "Any" for most dimensions and a specific level when that level is frequently queried in a particular dimension. The advisor typically includes the specific levels in one or more of the recommended slices and/or summary tables.

Report queries typically request data for a report. Typically, report queries are issued in batches, and users do not wait for an immediate response. A focus region associated with a report query type indicates that users typically create reports at the specified levels. In various embodiments, it is recommended that a user typically specify a focus region comprising "Any" for most dimensions and a specific level for a dimension when that level is frequently queried. The advisor typically includes the specific levels in one or more of the recommended slices and/or summary tables.

MOLAP extract queries typically retrieve data from specific slices of the multidimensional model and load the data into the MOLAP system. Typically the focus region for a MOLAP extract query type explicitly specifies a level from each dimension of the cube, that is, no levels are specified as "Any." In some embodiments, only one focus region per MOLAP extract query is allowed for a cube. In various embodiments, a focus region for a hybrid OLAP (HOLAP) extract cannot be defined when a focus region for a MOLAP extract is specified. The advisor recommendation will typically comprise a recommended slice and/or summary table comprising the specified levels of the focus region for the MOLAP extract query type.

A focus region for a HOLAP extract query type indicates that data is typically extracted using the specified focus region into a HOLAP cube. In some embodiments, the user specifies a focus region comprising a specific level for each dimension such that the focus region for the HOLAP extract query type comprises the levels of data to be extracted, referred to as a HOLAP extract line. The advisor recommendation will typically comprise a recommended slice and/or summary table comprising the specified levels of the focus region for the HOLAP extract query type. In some embodiments, only one focus region for a hybrid extract query type is allowed for a cube. In various embodiments, a focus region for a MOLAP extract cannot be defined when a focus region for a hybrid extract is specified. Zero or more focus regions for drill through queries may be defined in the same cube that contains a focus region for a HOLAP extract. In various embodiments, for a HOLAP extract query type for which no drill through focus region is specified, the advisor 70 (FIG. 1) will also attempt to recommend one or more additional recommended slices, each of which has at least one level below the levels of the specified focus region for the HOLAP extract.

Focus regions for drill through queries have a corresponding hybrid extract focus region specified in the cube. The user typically specifies a focus region for a drill through query type comprising one or more levels that are below the slice to be extracted in the HOLAP extract, that is, the HOLAP extract line. This is interpreted to mean that users frequently drill through to the specified region from a HOLAP cube. The advisor may recommend at least one recommended slice and/or summary table that contains the explicitly specified levels of the focus region for the drill through query type so that the recommended slice covers queries that could not be covered within the MOLAP portion of the hybrid cube.

An exemplary cube and exemplary meta-data create request 86 (FIG. 1) to update the meta-data with focus region information will now be described. The cube below is for a company and the measure is sales. The cube has time, store and product dimensions, and each dimension has a hierarchy. The levels are listed in their hierarchical order. The exemplary cube is defined as follows:

Cube: COMPANY.Sales
   CubeDimension: COMPANY.Time
   CubeHierarchy: COMPANY.Time
     CubeLevel: COMPANY.Year
     CubeLevel: COMPANY.Quarter
     CubeLevel: COMPANY.Month
     CubeLevel: COMPANY.Day
   CubeDimension: COMPANY.Store
   CubeHierarchy: COMPANY.Store
     CubeLevel: COMPANY.StoreCountry
     CubeLevel: COMPANY.StoreRegion
     CubeLevel: COMPANY.StoreState
     CubeLevel: COMPANY.StoreCity
     CubeLevel: COMPANY.Store
   CubeDimension: COMPANY.Product
   CubeHierarchy: COMPANY.Product
     CubeLevel: COMPANY. ProductGroup
     CubeLevel: COMPANY.ProductLine
     CubeLevel: COMPANY.Product The exemplary the meta-data create request 86 (FIG. 1) for focus regions for the exemplary cube above will now be described. The request to create the meta-data is followed by the associated meta-data, in this example, the focus region. In some embodiments, the request to create the meta-data and the associated meta-data is considered to be a single request. In various embodiments, the request to create the meta-data and the meta-data use the extensible markup language (XML). The exemplary meta-data create request is as follows:

```
<olap:request xmlns:olap="URL1" xmlns:xsi="URL2"
xmlns:xsd="URL3" version="version number">
    <create/>
</olap:request>
```

In the exemplary create request above, the terms "URL1", "URL2" and "URL3" are used. In practice, actual uniform resource locators (URLs) would be specified.

In the following example of the meta-data that follows the create request, two focus regions are specified. One focus region is for a query type of MOLAP extract, having the levels of Quarter, Store State and Product Line. The other focus region is for a query type of report having the levels of Month, All Stores, and "Any" product level. The following exemplary XML meta-data specifies that data is extracted into a MOLAP product at the [Quarter-Store State-Product Line] levels. In addition, there are report style queries that query sales data for all stores by month but for different levels within the product dimension. In the exemplary request below, the term "optimization slice" is used to specify a focus region. In the exemplary meta-data, the term "optimization slice" is used to specify a focus region. The exemplary meta-data associated with the request to create the meta-data is as follows:

```
<?xml version="1.0" encoding ="UTF-8" ?>
<olap:metadata xmlns:olap="URL1" xmlns:xsi="URL2"
xmlns:xsd="URL3" version="version number">
    <cube name="Sales" schema="COMPANY" businessName=
    "Sales">
    <cubeModelRef name="SalesModel" schema="COMPANY"/>
    <cubeFactsRef name="SalesCubeFacts" schema="COMPANY"/>
    <cubeDimensionRef name="Time" schema="COMPANY"/>
    <cubeDimensionRef name="Store" schema="COMPANY"/>
    <cubeDimensionRef name="Product" schema="COMPANY"/>
    <optimizationSlice type="molapextract">
        <optimizationLevel>
            <cubeDimensionRef name="Time" schema="COMPANY"/>
            <cubeHierarchyRef name="Time" schema="COMPANY"/>
            <cubeLevelRef name="Quarter" schema="COMPANY"/>
        </optimizationLevel>
        <optimizationLevel>
            <cubeDimensionRef name="Store" schema="COMPANY"/>
            <cubeHierarchyRef name="Store" schema="COMPANY"/>
            <cubeLevelRef name="StoreState" schema="COMPANY"/>
        </optimizationLevel>
        <optimizationLevel>
            <cubeDimensionRef name="Product" schema="COMPANY"/>
            <cubeHierarchyRef name="Product" schema="COMPANY"/>
            <cubeLevelRef name="ProductLine" schema="COMPANY"/>
        </optimizationLevel>
```

```
        </optimizationSlice>
        <optimizationSlice type="report">
            <optimizationLevel>
                <cubeDimensionRef name="Time" schema="COMPANY"/>
                <cubeHierarchyRef name="Time" schema="COMPANY"/>
                <cubeLevelRef name="Month" schema="COMPANY"/>
            </optimizationLevel>
            <optimizationLevel>
                <cubeDimensionRef name="Store" schema="COMPANY"/>
                <cubeHierarchyRef name="Store" schema="COMPANY"/>
                <allLevel/>
                <!-- Note: This optimizationLevel points to the
"All" level -->
            </optimizationLevel>
            <optimizationLevel>
                <cubeDimensionRef name="Product" schema="COMPANY"/>
                <cubeHierarchyRef name="Product" schema="COMPANY"/>
                <anyLevel/>
                <!-- Note: "anyLevel" means that advisor determines
optimizationLevel -->
            </optimizationLevel>
        </optimizationSlice>
    </cube>
</olap:metadata>
```

Although the exemplary meta-data above specifies a schema, in other embodiments, a schema is not used. In the <optimizationSlice> tag, the type is used to specify the query type. The <optimizationLevel> tag is used to specify the dimension, hierarchy and level. The <allLevel> tag specifies that the "All" level is used for the associated dimension and hierarchy. The <anyLevel> tag specifies the "Any" pseudo-level, for which the advisor determines the level, for the associated dimension and hierarchy.

To populate the meta-data tables, for each focus region (optimization slice) in the meta-data following the create request, the meta-data update module 69 (FIG. 1) determines a cube identifier, dimension identifier, hierarchy identifier, level identifier based on the cube name, dimension name, hierarchy name and level name, respectively, from the meta-data following the create request. The meta-data update module 69 (FIG. 1) accesses a meta-data table containing the cube names and associated cube identifiers, and retrieves the cube identifier based on the cube name specified as part of the request, to provide the determined cube identifier. For each optimization level of the focus region or optimization slice, the meta-data update module 69 (FIG. 1) accesses a meta-data table containing the dimension names and dimension identifiers, and retrieves the dimension identifier based on the dimension name specified as part of the request, to provide the determined dimension identifier. The meta-data update module 69 (FIG. 1) accesses a meta-data table containing the hierarchy names and hierarchy identifiers, and retrieves the hierarchy identifier based on the hierarchy name specified as part of the request, to provide the determined hierarchy identifier. The meta-data update module 69 (FIG. 1) accesses a meta-data table containing the level names and level identifiers, and retrieves the level identifier based on the level name specified as part of the request, to provide the determined level identifier. In various embodiments, the meta-data update module 69 (FIG. 1) determines a unique focus region identifier that is associated with the specified focus region. The determined cube identifier, the determined focus region identifier, and query type are stored in the cube_id 182 (FIG. 5B), focusregion_id 184 (FIG. 5B) and querytype 186 of the cube-focus region table 82 (FIG. 5B).

The level reference type is also determined based on the meta-data of the request. For example, when a tag specifies <anyLevel>, the level reference type is set to a first value, when a tag specifies <allLevel>, the level reference type is set to a second value, and when a tag specifies a specific level, the level reference type is set to a third value. The determined cube identifier, the determined focus region identifier, the determined dimension identifier, the determined hierarchy identifier, level reference type and level identifier are stored in the cube_id 192 (FIG. 5C), focusregion_id 194 (FIG. 5C), dim_id 196 (FIG. 5C), hier_id 198 (FIG. 5C), levelreftype 200 (FIG. 5C) and level_id 202 (FIG. 5C), respectively, of the focus-region-level table 84 (FIG. 5C).

In some embodiments, a measure is also associated with a focus region. For example, the optimization slice tag may be associated with measures, such as Sales and Cost, as follows:

```
<optimizationSlice . . .>
    <measures>
        <measureRef name="Sales" schema="COMPANY"/>
        <measureRef name="Cost" schema="COMPANY"/>
    </measures>
    <optimizationLevel>
        . . .
    </optimizationLevel>
    . . .
    <optimizationLevel>
        . . .
    </optimizationLevel>
</optimizationSlice>
```

When a measure has been specified, the focus-measure table 85 (FIG. 5D) is updated. In this example, the focus region identifier has been determined as described above. The meta-data update module 69 (FIG. 1) determines the measure identifier from the meta-data based on the measure name, in this example, "Sales." In the meta-data, a table contains the measure names and associated measure identifiers (measure_id). The meta-data update module 69 (FIG. 1) accesses that table and retrieves the measure identifier (measure_id) associated with the specified measure name. The meta-data update module 69 (FIG. 1) inserts a row containing the focus region identifier and measure identifier into the focusregion_id and measure_id columns, 204 and 206 (FIG. 5D), respectively, of the focus-measure table 85 (FIG. 5D).

In some embodiments, the specified amount of disk space is an approximate value, and the aggregations based on the recommended slice(s) and/or summary table(s) may use close to the specified amount of disk space. The aggregations based on the recommended slice(s) and/or summary table(s) may use more or less disk space than the specified amount of disk space.

Figure 7:
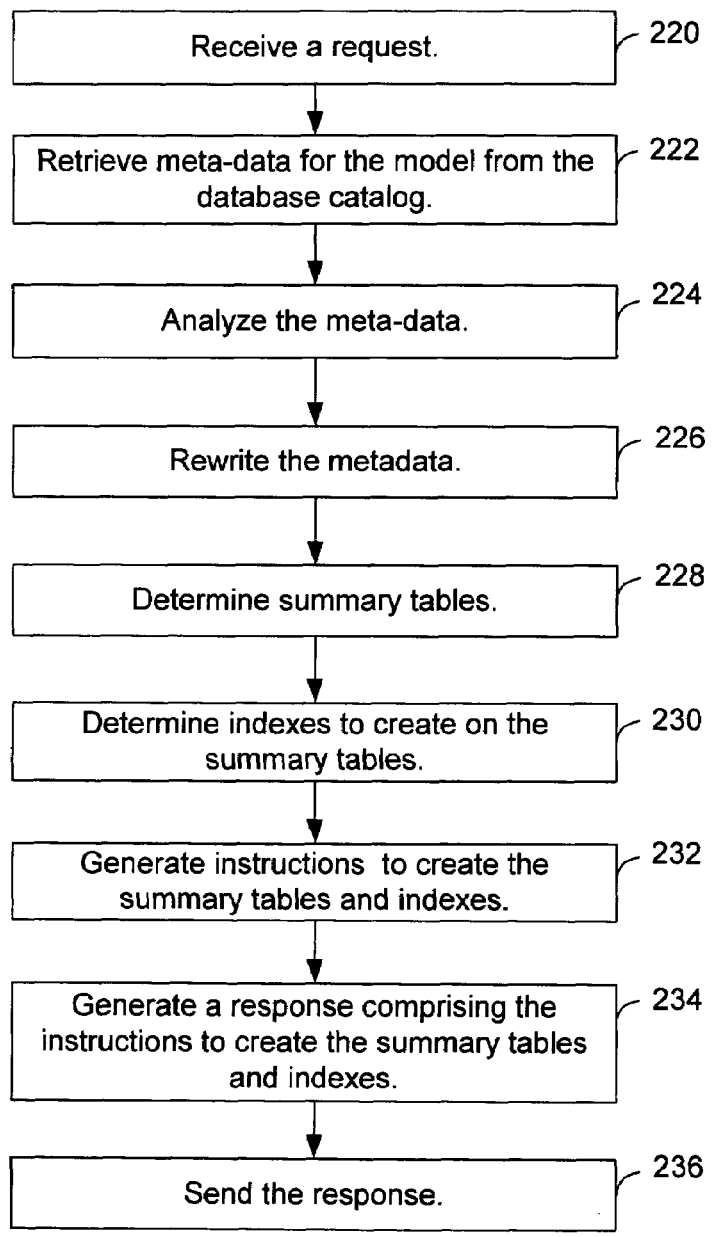
FIG. 7 depicts a flowchart of an embodiment of the processing of the advisor of FIG. 1.

FIG. 7 depicts a flowchart of an embodiment of the processing of the advisor. In step 220, the advisor receives an advisor request to optimize a cube model. In various embodiments, the advisor request specifies a cube model and other information to guide the advisor such as disk space and time limits. The advisor assumes that the cube model can be optimized. In some embodiments, a validation is performed to check if there is sufficient information available to make a recommendation. In addition, in various embodiments, the underlying database objects that comprise the cube model are checked to ensure that if a recommendation is made, the database management system will be able to exploit the recommended summary tables.

In step 222, the meta-data associated with the cube model is read from the database catalog. The meta-data 76 (FIG. 1) comprises one or more focus regions and associated query types for the specified cube model. This meta-data 76 (FIG. 1) also comprises the meta-data for any objects that are logically part of the cube model comprising facts, dimensions, hierarchies, attributes, measures and cubes.

In step 224, the meta-data is analyzed. The measures are analyzed to determine if they are distributive or non-distributive. Distributive measures are put in one measure set. For each group of non-distributive measures with the same dimensionality, an additional measure set is created. Each measure set is optimized separately. In some embodiments, the resources specified in the request will be apportioned across the measure sets based on their perceived priority. In various embodiments, distributive measures are given a higher priority and therefore more resources. In another embodiment, measures that are used frequently are put into a high priority measure set based on usage information or appearances in cubes of the cube model.

In step 226, the meta-data is rewritten to facilitate optimization. For example, if the cube model does not contain any cubes then the advisor synthesizes at least one cube. If a cube does not have a focus region, for example, when the cube is synthesized by the advisor or if the user defined a cube but did not specify a focus region, then the advisor will define a drill down focus region for the cube with each level specified as "Any". This will result in the advisor optimizing the entire cube for drill down queries with a drill down focus region.

If, for a cube, a focus region with a query type of HOLAP extract is specified and no focus region with a query type of drill through is specified, the advisor defines a focus region comprising the "Any" level for all dimensions with a query type of drill through.

In step 228, the summary tables are determined. When determining summary tables, the advisor determines one or more recommended slices based on at least one focus region. The summary tables are based on the recommended slices, and, when built, store one or more aggregations associated with the recommended slices. In step 230, indexes are also selected based on the summary tables. In step 232, instructions are generated to create the summary tables and their indexes and, in some embodiments, the instructions are stored in one or more scripts. In various embodiments, the instructions are structured query language (SQL) statements. In step 234, a response is generated that contains the scripts. In various embodiments, the response further comprises additional information about the processing. In some embodiments, the response uses XML. In step 236, the response is sent to the application 60 (FIG. 1) to present to the user.

Figure 8:
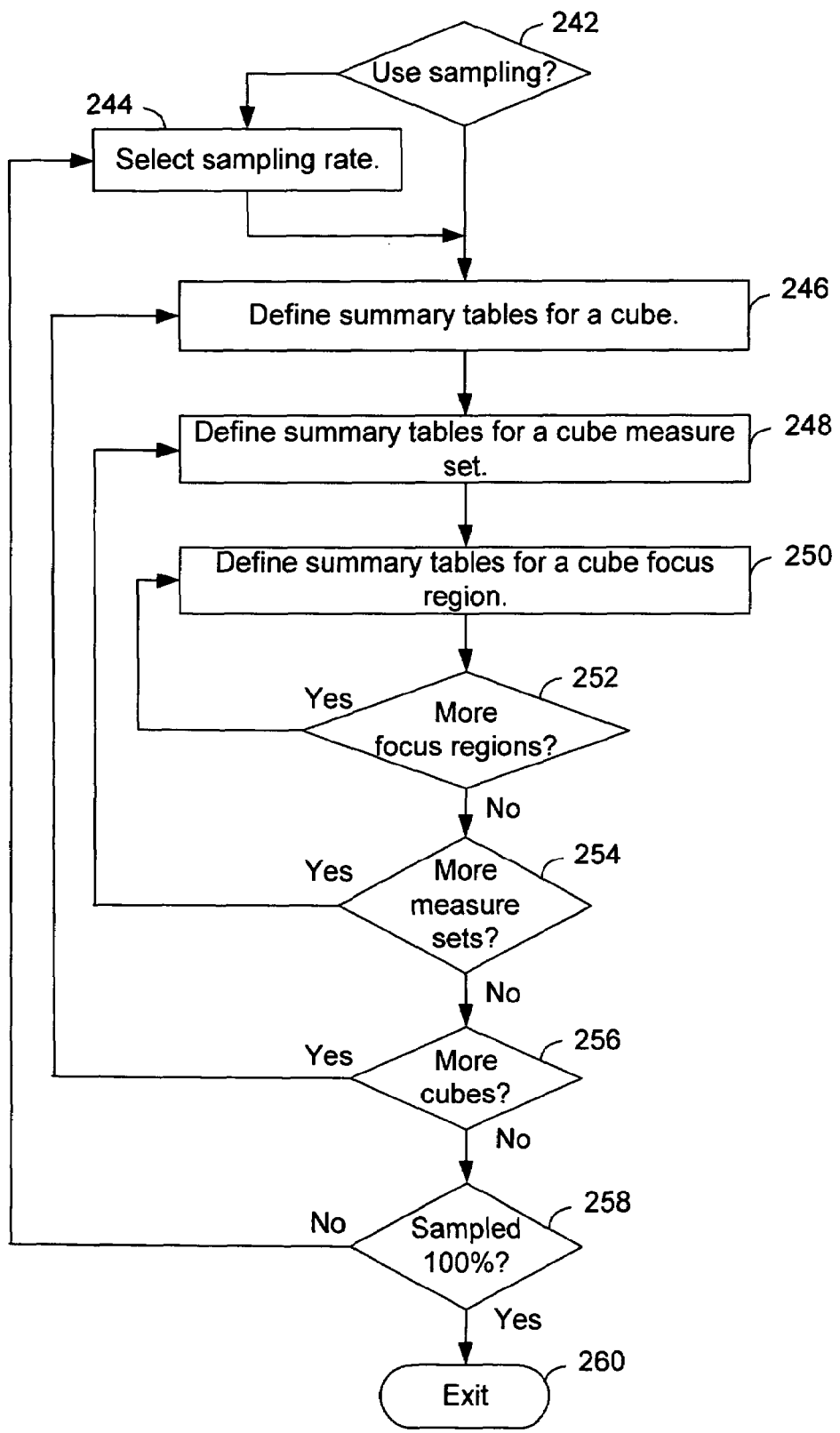
FIG. 8 depicts a flowchart of an embodiment of the step of determining summary tables of FIG. 7.

FIG. 8 depicts a flowchart of an embodiment of step 228 of FIG. 7 to determine the summary tables. In various embodiments, one aspect of determining summary tables is estimating the number of rows that a summary table will contain. In some embodiments, the advisor 70 (FIG. 1) supports several techniques for estimating the number of rows in a summary table.

Step 242 determines whether sampling will be used to estimate the number of rows when defining the summary tables. In various embodiments, the advisor request specifies whether sampling will be used. When step 242 determines that sampling will be used, in step 244, a sampling rate is selected and the advisor samples the data in the cube model when determining recommended summary tables. Step 244 proceeds to step 246. When step 242 determines that sampling will not be used, database statistics will be used to estimate the number of rows, and step 242 proceeds to step 246.

The subsequent operation of the logic depends on which row estimation technique will be used. When sampling is used, there will be multiple passes and the advisor reads a subset of the fact table to estimate the rows in the summary tables. When sampling is not used, the advisor estimates the number of rows in the summary table by using an estimate provided by the database management system's optimizer.

The logic that defines the summary tables has three loops. The outer loop defines summary tables for each cube in the model. In step 246, summary tables are defined for a cube. The middle loop iterates through the measure sets of the cube. In step 248, summary tables are defined for a cube measure set. In step 250, in the innermost loop, summary tables are defined for a focus region of a measure set of the cube. Step 252 determines if there are more focus regions for the measure set of the cube for which to define summary tables. If so, step 252 proceeds to step 250 to process another focus region for the measure set for the cube. When step 252 determines that there are no more focus regions for the cube measure set of the cube, step 254 determines if there are more measure sets for which to define summary tables. If so, step 254 proceeds to step 248 to process another measure set. When step 254 determines that there are no more measure sets for the cube for which to define summary tables, step 256 determines if there are more cubes for which to define summary tables. If so, step 256 proceeds to step 246 to process another cube.

When step 256 determines that there are no more cubes for which to define summary tables, step 258 determines if the sampling is complete. The sampling is complete when the facts table has been completely sampled, that is, when all the data in the facts table has been read. If not, step 258 proceeds to step 244 to select a higher sampling rate and repeat the process. The higher sampling rate specifies a percentage of data of the facts table that the advisor reads during an iteration. When all the data in the facts table has been read, in step 260, the flowchart exits.

Figure 9B:
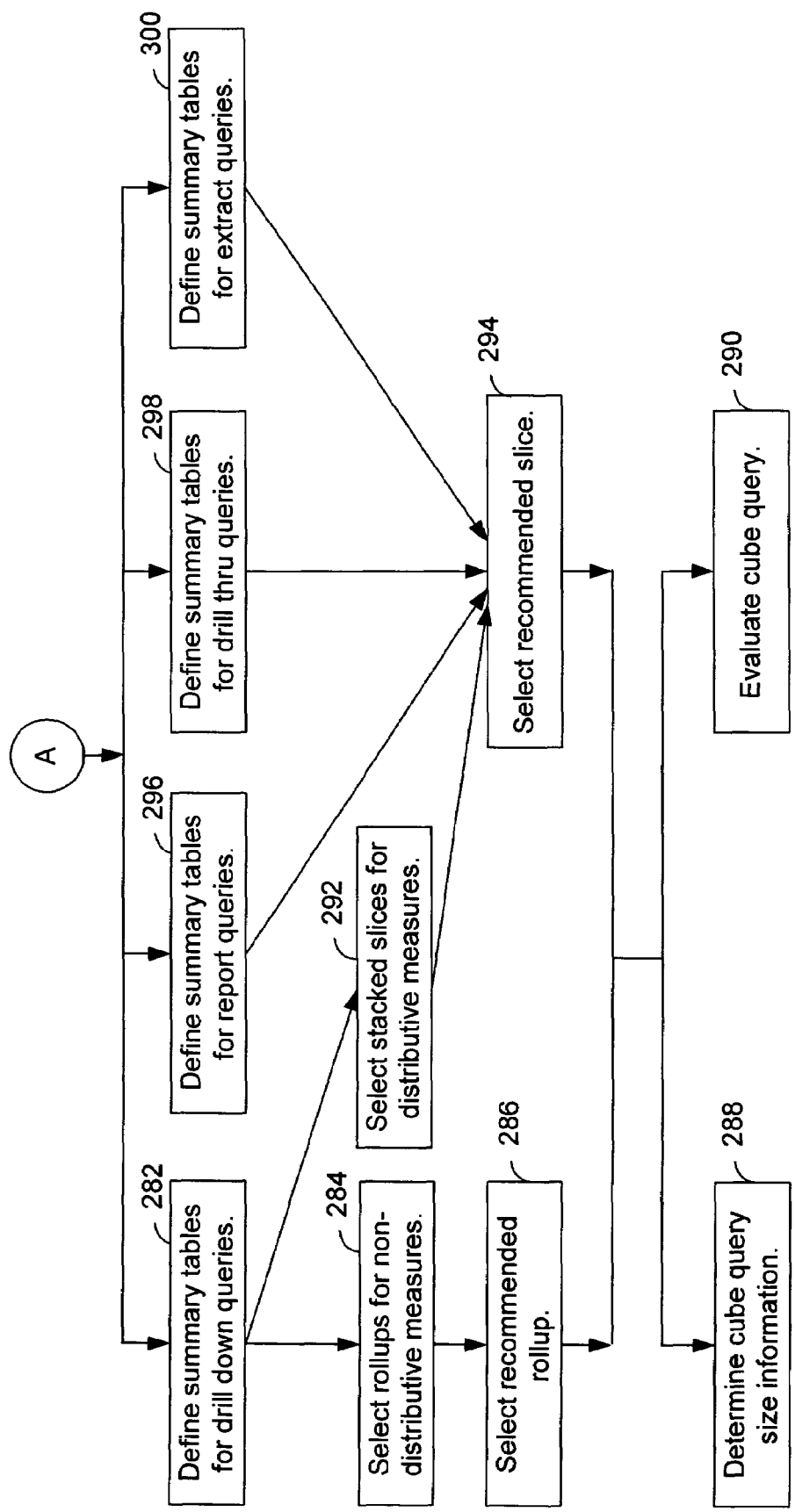
FIG. 9 is comprised of FIGS. 9A and 9B which collectively depict a flowchart of an embodiment of a static view of the step of determining summary tables of FIG. 7.

FIGS. 9A and 9B collectively depict a flowchart of an embodiment of a static view of step 228 of FIG. 7 to determine summary tables. The static view represents a single pass through the flowchart of FIG. 7 and provides further detail.

In step 270, a procedure to define summary tables for a cube model is invoked. The cube model is specified in the advisor request. Depending upon the specified row estimation technique, in step 272, summary tables will be defined using sampling, or in step 274, summary tables will be defined using statistics. This exemplary flowchart represents either a single iteration of the definition of summary tables using sampling, or the definition of summary tables using statistics.

In step 276, summary tables are defined for a cube of the cube model. In some embodiments, a procedure to define a summary table for a cube is invoked. In various embodiments, the cube is defined in the meta-data. In some embodiments, when the cube model does not contain cubes, the advisor defines a virtual cube by selecting one hierarchy from each dimension. To reduce the complexity and number of cubes that are generated the advisor may choose to consolidate hierarchies. The number of virtual cubes is determined by the number of hierarchies remaining after hierarchies are consolidated. In some embodiments, the resources, such as the specified disk space and the specified amount of time to generate recommendations specified in the advisor request, will be divided equally among the cubes and virtual cubes. In various embodiments, a virtual cube is the same as a cube. In an alternate embodiment, more resources are provided to the cubes or virtual cubes that are larger. Alternately, more resources are provided to the cubes that are deemed to be more important based on the usage history. The virtual cubes are associated with the measure sets of the cubes from which the virtual cubes were determined. The advisor will process each focus region for each measure set for each virtual cube. The term cube will be used to refer to both specified cubes and virtual cubes.

The procedure to define summary tables for the cube invokes, in step 278, a procedure to define summary tables for a cube measure set for the cube. In various embodiments, the specified amount of disk space for a cube is divided equally among all the measure sets for the cube. The procedure to define summary tables for a cube measure set invokes, for each cube measure set for the cube, in step 280, a procedure to define summary tables for a focus region for each measure set of the cube. In various embodiments, the amount of disk space for the cube measure set is divided equally among the focus regions for the measure set of the cube. The flowchart of FIG. 9A continues via continuator A to FIG. 9B.

The procedure to define summary tables for a focus region invokes different procedures depending on the specified query type for the focus region. When a focus region is associated with a query type of drill down, in step 282, a procedure to define summary tables for drill down queries is invoked. When the cube contains non-distributive measures, in step 284, rollups are selected in accordance with the focus region, in step 286, the recommended rollup is selected. To determine the recommended rollup, step 286 invokes, in step 288, a determine cube query size information procedure, and in step 290, an evaluate cube query procedure. The determine cube query size information procedure and evaluate cube query procedure will be described in further detail below.

When the cube contains distributive measures, in step 292, stacked slices are selected by specifying one or more focus regions and step 292 proceeds to step 294 to select the recommended slice for each focus region. The selection of stacked slices will be described in further detail below with reference to FIG. 15.

When a focus region is associated with a query type of report, in step 296, a procedure to define summary tables for report queries is invoked. Step 296 proceeds to step 294 to select the recommended slice based on the focus region.

When a focus region is associated with a query type of drill through, in step 298, a procedure to define summary tables for drill through queries is invoked which proceeds to step 294 to select the recommended slice.

When a focus region is associated with a query type for an extract query, such as MOLAP or HOLAP extract, in step 300, a procedure to define summary tables for extract queries is invoked. The procedure to define summary tables for extract queries proceeds to step 294 to select the recommended slice.

In step 294, the procedure to select a recommended slice selects a recommended slice based on, at least in part, the focus region.

For MOLAP and HOLAP extract query types, the focus region typically specifies the levels of the slice to extract. The select recommended slice procedure typically recommends a slice that comprises all the specified levels of the focus region.

In various embodiments, such as for drill down, report, and drill through query types, the select recommended slice procedure selects the lowest level slice within the focus region that meets the specified disk space and row limits.

The focus region is meta-data which indicates which levels within a hierarchy to focus on for optimization and which hierarchies have no levels in which to focus optimization. The advisor translates the focus region meta-data into a combination which is stored in the combination object 94 (FIG. 1) described above. The combination object 94 (FIG. 1) has the effect of focusing the advisor optimization on the specified focus region.

The procedures to define summary tables for drill down, report, drill through and extract queries, in steps 282, 296, 298 and 300, respectively, specify a combination that represents the region to be optimized, and pass the combination to either the select recommended slice or rollup procedure, 294 or 286, respectively. In some embodiments, the procedure to select a recommended slice is passed a reference to a cube in addition to the combination. The procedure to select a recommended slice selects a slice based on, at least in part, the combination. The combination is a mapping between the levels specified in the focus region and is described in further detail below with respect to FIGS. 10, 11 and 12.

Figure 10:
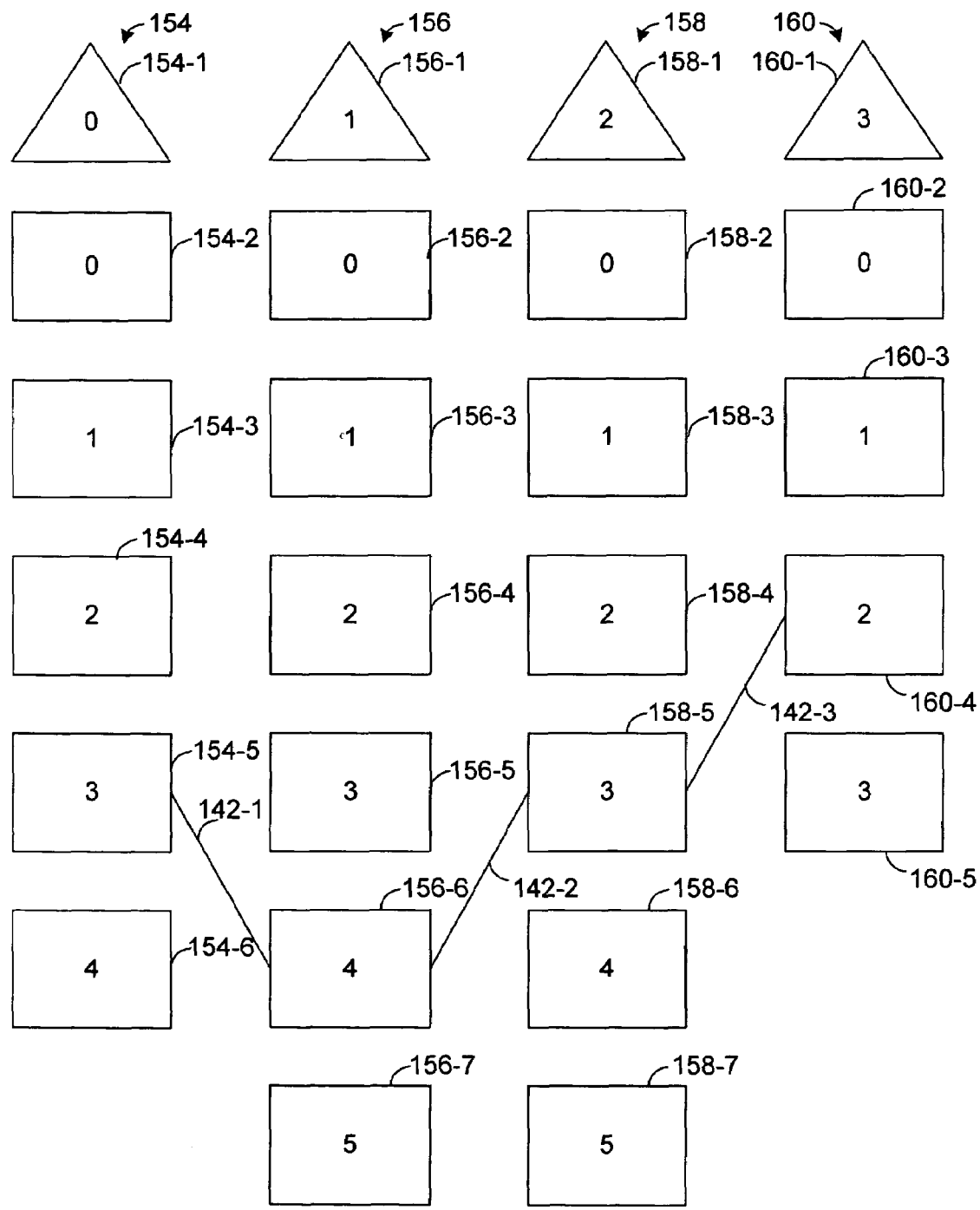
FIG. 10 depicts the exemplary multidimensional model of FIG. 3 with an exemplary slice using combination notation.

FIG. 10 depicts the dimensions of FIG. 3 using combination notation. The dimensions 154-1, 156-1, 158-1 and 160-1, and levels 154-2 to 154-6, 156-2 to 156-7, 158-2 to 158-7, and 160-2 to 160-5, are represented as integers, starting with zero. In FIG. 10, the integer associated with a dimension is inside the triangle, and the integers associated with the levels are shown inside the blocks. For example, block 154-2, the "All" level for the time dimension contains a zero. In an alternate embodiment, the dimensions and levels are represented as integers, starting with a non-zero integer. Each dimension 154-1, 156-1, 158-1 and 160-1 is associated with a unique number and each level within a dimension is associated with a unique number. In FIG. 10, the levels are numbered from zero for the "All" level to n, where n is the number of levels in a hierarchy. A combination comprising a set of integers represents a region, and in some embodiments, a slice. The combination comprises a set of positions. Each position is associated with a dimension and at least one level. Each position has a range of numbers. For example, combination [3-3,4-4, 3-3,2-2] represents a slice comprising Month 154-5, Store City 156-6, Customer State 158-5, and Product Line 160-4. In some embodiments, the combination for a slice may be represented using a single integer in each position, such as [3, 4, 3, 2].

Figure 11:
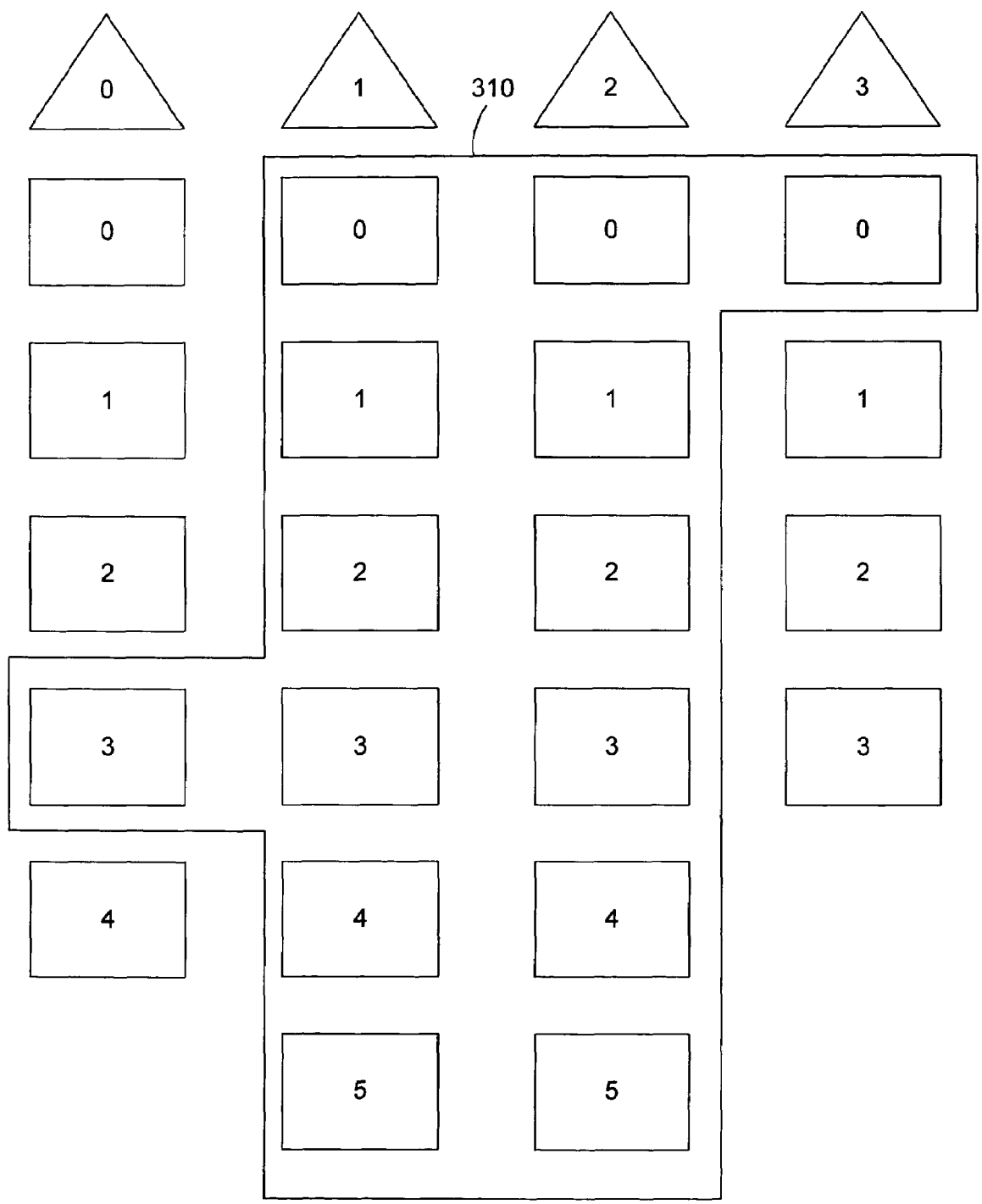
FIG. 11 depicts the exemplary multidimensional model of FIG. 3 with an exemplary region using combination notation.

FIG. 11 depicts a diagram of an exemplary region 310 of the cube of FIG. 3. The region is indicated by a line that contains month within the time dimension, all levels within the store and customer dimensions, and the "All" products level in the product dimension. This region contains 1×6×6× 1=36 slices. The slices are as follows:

1. [Month, All Stores, All Customers, All Products] ([3, 0, 0, 0])
2. [Month, All Stores, Customer Country, All Products] ([3, 0, 1, 0])
3. . . .
36. [Month, Store Name, Customer Name, All Products] ([3, 5, 5, 0])

A region is also represented using the combination. In some embodiments, one or more positions of the combination are associated with a range. The range specifies "from" and "to" levels of the dimension or hierarchy associated with the position. Referring also to FIG. 3, for example, the region 310 of FIG. 11 is defined by [Month-Month, All Stores-Store Name, All Customers-Customer Name, All Products-All Products] and is represented as [3-3,0-5, 0-5,0-0]. For the Store dimension, the range specifies the levels from the All Stores level to the Store Name level, and therefore comprises the six levels of the Store dimension. For the Time dimension, the range specifies the levels from the Month level to the Month level, and therefore comprises a single level in the Time dimension.

Focus regions are represented using the combination which is stored in a data structure referred to as the combination object 94 (FIG. 1). For a hierarchy or dimension having "Any" specification in a focus region, the combination is set to O-n where n is the number of non-"All" levels in the hierarchy or dimension, respectively. For an "All" level, the combination position is set to 0-0. For a specific level, the combination position is set to s-s where s is the specified level number.

In various embodiments, the select recommended slice procedure of FIG. 9B iterates through the candidate slices within the combination specified by the focus region when evaluating candidate slices, starting at the highest level slice in the focus region and ending at the lowest level slice in the focus region. For example, using the focus region defined above with reference to FIG. 11 [3-3,0-5, 0-5,0-0], the iteration starts at the slice represented by [3, 0, 0, 0]. In some embodiments, the iteration continues through the focus region as follows: [3, 0, 1, 0], [3, 0, 2, 0] to [3, 5, 5, 0].

Figure 12:
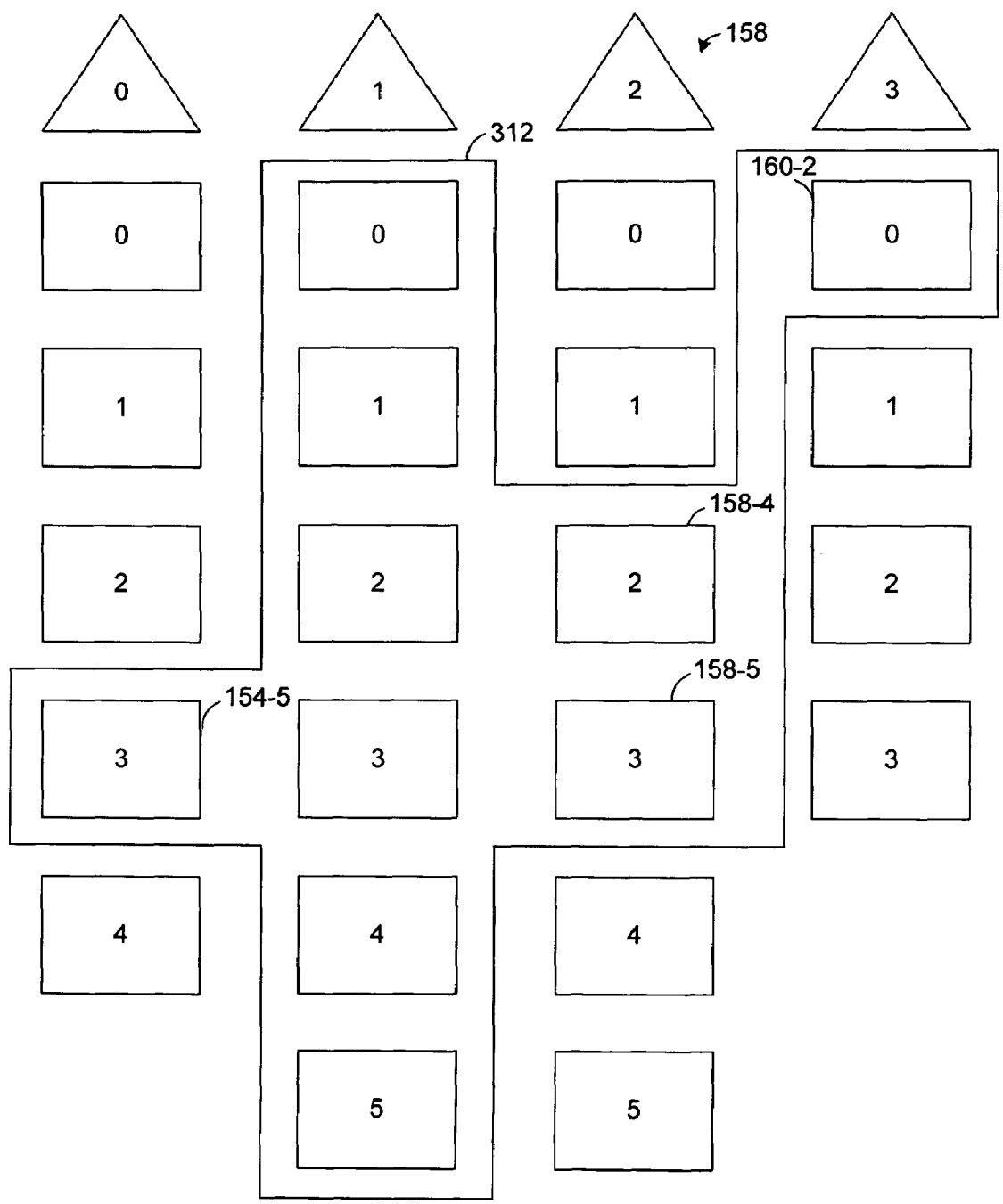
FIG. 12 depicts the exemplary multidimensional model of FIG. 3 with another exemplary region using combination notation.

FIG. 12 depicts the exemplary multidimensional model of FIG. 3 with another exemplary focus region 312 using combination notation. The focus region 312 specifies month 154-5 for the time dimension, "Any" for the store dimension, and "All" products level 160-2 for the product dimension. In this embodiment, for the customer dimension, the focus region 312 specifies the Customer Region 158-4 and Customer State 158-5 levels as the upper and lower levels, respectively, of a range. When a focus region specifies a range with upper and lower levels for a dimension, the combination is set to those upper and lower levels for that dimension. The combination for focus region 312 is [3-3,0-5, 2-3,0-0].

Figure 13:
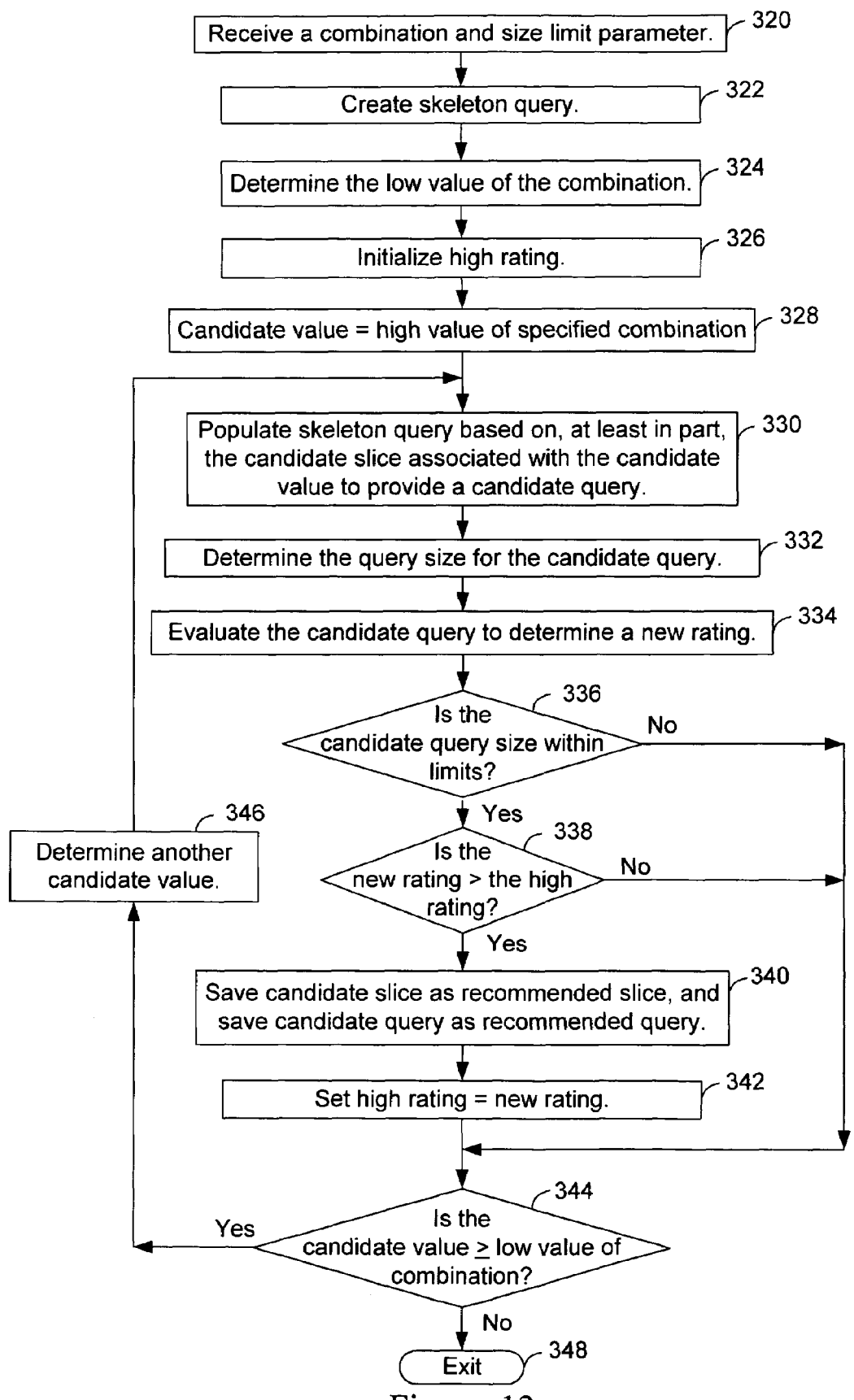
FIG. 13 depicts a flowchart of an embodiment of a procedure to select a recommended slice of FIG. 9B.

FIG. 13 depicts a flowchart of an embodiment of a procedure to select a recommended slice of step 294 of FIG. 9B. In step 320, a combination and a size limit are received. In some embodiments, a reference to a cube model is also received. In step 322, a skeleton query is created. The skeleton query is to create one or more summary tables based on information which will be populated. In some embodiments, the skeleton query is also created based on the received reference to the cube model. As the select recommended slice procedure iterates through candidate slices within the combination, the skeleton cube query will be updated to reference the candidate slice to provide a candidate query. The desired measures are populated in the skeleton query based on the measure set being evaluated. In other embodiments, the measure set is specified as part of the meta-data of the cube model, or alternately, as part of the request to the advisor.

In an alternate embodiment, the focus region also specifies measures. In various embodiments, the measures are specified in the meta-data create request. In this embodiment, one or more measures for the focus region are determined from the focus-measure table 85 of FIG. 5D, one or more measures for the focus region are retrieved from the meta-data, such as the focus-measure table 85 of FIG. 5D, and populated in the skeleton query in step 330 of FIG. 13.

In step 324, the low value of the combination is determined. In step 326, a variable called high rating is initialized to zero. In step 328, a candidate value is set equal to the high value of the combination. The high value represents the highest levels in the hierarchies of the focus region associated with the combination. The candidate value is used to select candidate slices when iterating through the one or more ranges of values within the specified combination. At this point, the slice associated with the candidate value is referred to as the candidate slice. In step 330, the skeleton query is populated based on, at least in part, the candidate slice to provide a candidate query.

The candidate query is for a measure set which is aggregated at the set of levels specified by the candidate slice for a cube.

In step 332, the estimated query size is determined for the candidate query. The size of the candidate query comprises an estimated number of rows returned by the query and the estimated width of the rows. In this way, the amount of disk space used by the summary table generated by the candidate query can be determined.

In step 334, the candidate query is evaluated to determine a new rating. In various embodiments, the rating is determined for the candidate query based on the available disk space, width, coverage, and other criteria which will be described in further detail below.

Step 336 determines whether the candidate query size is within the size limit. The request to the advisor comprises a disk space limit. In various embodiments, the disk space limit is divided equally among the cubes of the cube model, the measure sets of each cube and the focus regions for each cube. In other embodiments, one or more weighting parameters are associated with one or more focus regions, respectively. The disk space limits for each cube, measure set and focus region are adjusted based on the weighting parameters so that some focus regions may be allotted more disk space than other focus regions. For example, the size limit for each focus region may be determined based on the following relationship:

$$sw1+sw2+ \ldots +swn=\text{temporary disk space limit,}$$

where w1, w2 . . . wn are the weighting parameters for respective focus regions, s represents the size limit when the weighting parameter is equal to one, and the temporary disk space limit has a value depending on the grouping of the focus regions. For example, for all the focus regions for all cubes, the temporary disk space limit is equal to the specified size limit parameter. For all the focus regions of a single cube, the temporary disk space limit is equal to the amount of space allocated for that cube. For all the focus regions of a measure set of a cube, the temporary disk space limit is equal to the amount of space allocated for that measure set of a cube. For each focus region, the size limit is equal to the product of s and the weighting parameter.

In some embodiments, the weighting parameter for a focus region is specified by a user in the advisor request. In other embodiments, the weighting parameter for the focus region is specified in the meta-data create request and stored as part of the meta-data for the focus region. In yet other embodiments, the advisor determines the weighting parameter based on, for example, usage statistics.

When step 336 determines that the candidate query size is within the size limit, step 338 determines whether the new rating is greater than the high rating. When the new rating is greater than the high rating, in step 340, the candidate slice is saved as the recommended slice, and the candidate query is saved as the recommended query. In step 342, the high rating is set equal to the new rating.

When step 336 determines that the candidate query size is not within the size limit, step 336 proceeds to step 344. When step 338 determines that the new rating is not greater than the high rating, step 338 proceeds to step 344.

Step 344 determines whether the candidate value is greater than or equal to the low limit of the combination. If so, in step 346, another candidate value is determined. In some embodiments, each slice within a focus region is processed. In other embodiments, heuristics are applied such that a subset of all the slices in the focus region are processed.

When step 344 determines that the candidate value is less than the low limit of the combination, the recommended slice has been determined. A query to create a summary table based on the recommended slice has been generated. For example, if the recommended slice includes the month, store location and product line, the summary table will store aggregations for the measure set based on the month, store location and product line. For example, the summary table may have columns for each measure of the measure set, a column for the month, another column for the store location and another column for the product line. The select recommended slice procedure returns the query to create the summary table to its callers who can then save it to be used to define a summary table. In step 348, the flowchart exits.

An embodiment of the determination of another candidate value will be explained by way of example. For a focus region comprising [a-b, c-d], position zero is associated with a range from level a to level b and position one is associated with range from level c to level d. In step 328, the initial candidate value will be [a, c]. In step 344, another candidate value is determined. Starting with the rightmost position, position one in the candidate value, the value in position one is incremented by one to provide a new position value. When the new position value is greater than d, the upper limit value for that position, the value in position zero is incremented by one and the value in position zero is set equal to c. In various embodiments having more than two positions, the process is repeated for each position until the value of a position that has been incremented by one is within the range for that position in the focus region. Step 344 determines one new candidate value at each pass. For example, referring also to FIG. 11, the region 310 is a focus region. Starting with an initial candidate value of [3, 0, 0, 0], sequential passes through step 344 determine candidate values as follows: [3, 0, 1, 0], [3, 0, 2, 0] [3, 0, 3, 0] [3, 0, 4, 0] [3, 0, 5, 0] [3, 1, 0, 0] [3, 1, 1, 0] [3, 1, 2, 0] [3, 1, 3, 0], [3, 1, 4, 0], [3, 1, 5, 0], [3, 2, 0, 0] . . . [3, 4, 5, 0], to [3, 5, 5, 0].

As described above, in various embodiments, the select recommended slice procedure evaluates every possible candidate slice within the combination associated with the focus region. In an alternate embodiment, the select recommended slice procedure evaluates a subset of the possible candidate slices of the combination. To do so, the select recommended slice procedure applies various heuristics to reduce the number of candidate slices. U.S. patent application Ser. No. 10/410,793, entitled "Method, System, and Program for Improving Performance of Database Queries," filed Apr. 9, 2003, to Nathan Gevaerd Colossi, et al. describes various heuristics to reduce the number of candidate slices.

In various embodiments, in step 284, a select rollups for non-distributive measures procedure selects rollups based on the focus region. In one embodiment, ideally, all possible rollups for a cube would be recommended and generated. However, time and space constraints limit the number of rollups. In various embodiments, in step 284, if the focus region has all "Any" levels, the advisor selects combinations such that for each combination, the combination specifies one level down from the "All" level for a subset of the dimensions and the "All" level for the remaining dimensions. Each dimension is typically included in the subset that specifies one level down from the "All" level in at least one combination. In some embodiments, the advisor also selects another combination that specifies a level from the time dimension and the "Any" levels for the remaining dimensions. The level that the advisor selects from the time dimension is below the "All" level.

In various embodiments, for drill down queries for which rollups will be generated, a user may specify a focus region with a lower level in one dimension and the "Any" levels in the remaining dimensions. In step 284, the combination for the focus region is determined. The advisor will restrict the combination to the specified lower level, and will specify the "Any" level for the remaining dimensions. If there is sufficient time and/or space the advisor will iteratively generate combinations that include the specified lower level, and lower levels for the remaining dimensions. The combinations are passed to the select recommended rollup procedure of step 286 of FIG. 9B to select the recommended rollups. The select recommended rollup procedure of step 286 of FIG. 9B is similar to the select recommended slice procedure of step 294. The size of a rollup is typically determined in the same way as a slice. In an alternate embodiment, when estimating the size using sampling, a different scaling factor is applied to the rollup row count to account for the fact that the rollup is a set of slices and the density of the model is greater for higher slices.

In step 282 of FIG. 9B, for query types of drill down, when a focus region has a specified level for at least one dimension and the "Any" level for the remaining dimensions, the advisor will restrict the focus region to the specified level for the associated dimensions, and for those dimensions associated with the "Any" level, the advisor will select the level. For example, referring also to the exemplary cube of FIG. 3, if the focus region is {quarter, state, Any, Any}, the restricted focus region is {Quarter:Quarter, Store State:Store State, All Customers:Customer Name, All Products:Product Name}. The restricted focus region is mapped to a combination which is used to select a recommended slice.

In step 300 of FIG. 9B, for a query type of MOLAP Extract, when the focus region has no "Any" levels, the focus region specifies a MOLAP slice, and the MOLAP slice will typically be extracted. When the focus region has at least one "Any" level, the advisor selects the "All" level for each "Any" level, and maps that focus region to a combination which is used to select a recommended slice.

In step 296 of FIG. 9B, for a query type of Report, when a focus region has a specified level for at least one dimension and the "Any" level for the remaining dimensions, the advisor will restrict the focus region to the specified level for the associated dimensions, and for those dimensions associated with the "Any" level, the advisor will select the level. When a focus region specifies the "Any" level for all dimensions, the advisor selects a time slice and a non-time slice. For the time slice, a first focus region is specified in which the time dimension is associated with a specific level, and the non-time dimensions are specified at the "Any" level. The specific level is the lowest level of the time dimension. For the non-time slice, a second focus region has the time dimension at the "All" level, and the remaining dimensions are set to "Any." The focus regions are mapped to respective combinations which are used to select a recommended slice for each combination.

In step 300 of FIG. 9B, for a query type of HOLAP extract, when a focus region having all "Any" levels is specified, the advisor selects a time slice and a non-time slice. For the time slice, a first focus region is specified in which the time dimension is associated with a specific level below the HOLAP extract line, and the non-time dimensions are specified at the "Any" level. In some embodiments, the specific level is the lowest level of the time dimension. For the non-time slice, a second focus region has the time dimension at the "All" level, and the remaining dimensions are set to "Any." When a focus region has a specified level for at least one dimension and the "Any" level for the remaining dimensions, the advisor will restrict the focus region to the specified level for the associated dimensions, and for those dimensions associated with the "Any" level, the advisor will select the level. When both a focus region with a query type of hybrid extract and a focus regions with a query type of drill through are specified, the advisor determines that at least one level of the drill through focus region is below the hybrid extract focus region. If so, the advisor selects a slice that is within the specified drill through focus region. The focus regions are mapped to respective combinations which are used to select a recommended slice for each combination.

Figure 14:
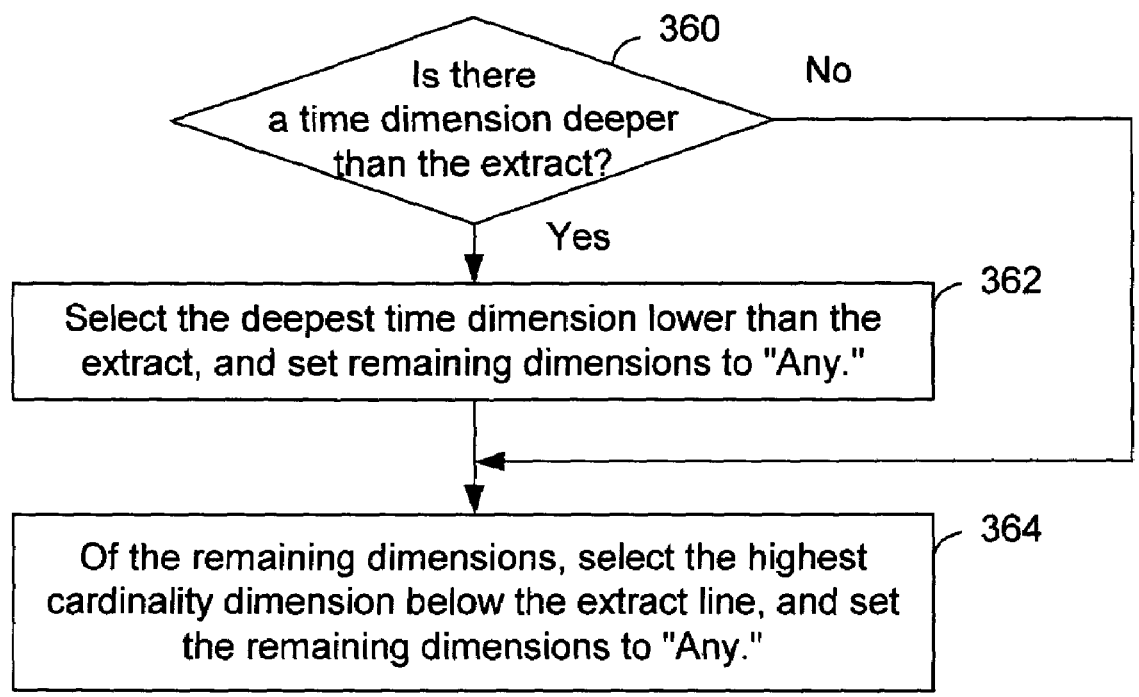
FIG. 14 depicts a flowchart of an embodiment of selecting combinations for a hybrid extract query type with a specified extract focus region and no specified drill through focus region.

FIG. 14 depicts a flowchart of an embodiment of selecting combinations, that is, focus regions, for a HOLAP extract query type with a specified extract focus region and no specified drill through focus region. Step 360 determines whether a time dimension has a level that is deeper than the HOLAP extract line. If so, in step 362, a first focus region is specified such that the deepest time dimension lower than the extract is selected, and the remaining dimensions are set to "Any." In step 364, a second focus region is specified such that of the remaining dimensions, the highest cardinality dimension below the HOLAP extract line is selected, and the remaining dimensions are set to "Any." When step 360 determines that a time dimension does not have a level that is deeper than the HOLAP extract line, step 360 proceeds to step 364. The focus regions are mapped to respective combinations. The technique of the flowchart of FIG. 13 is invoked for each combination to select a recommended slice.

Figure 15:
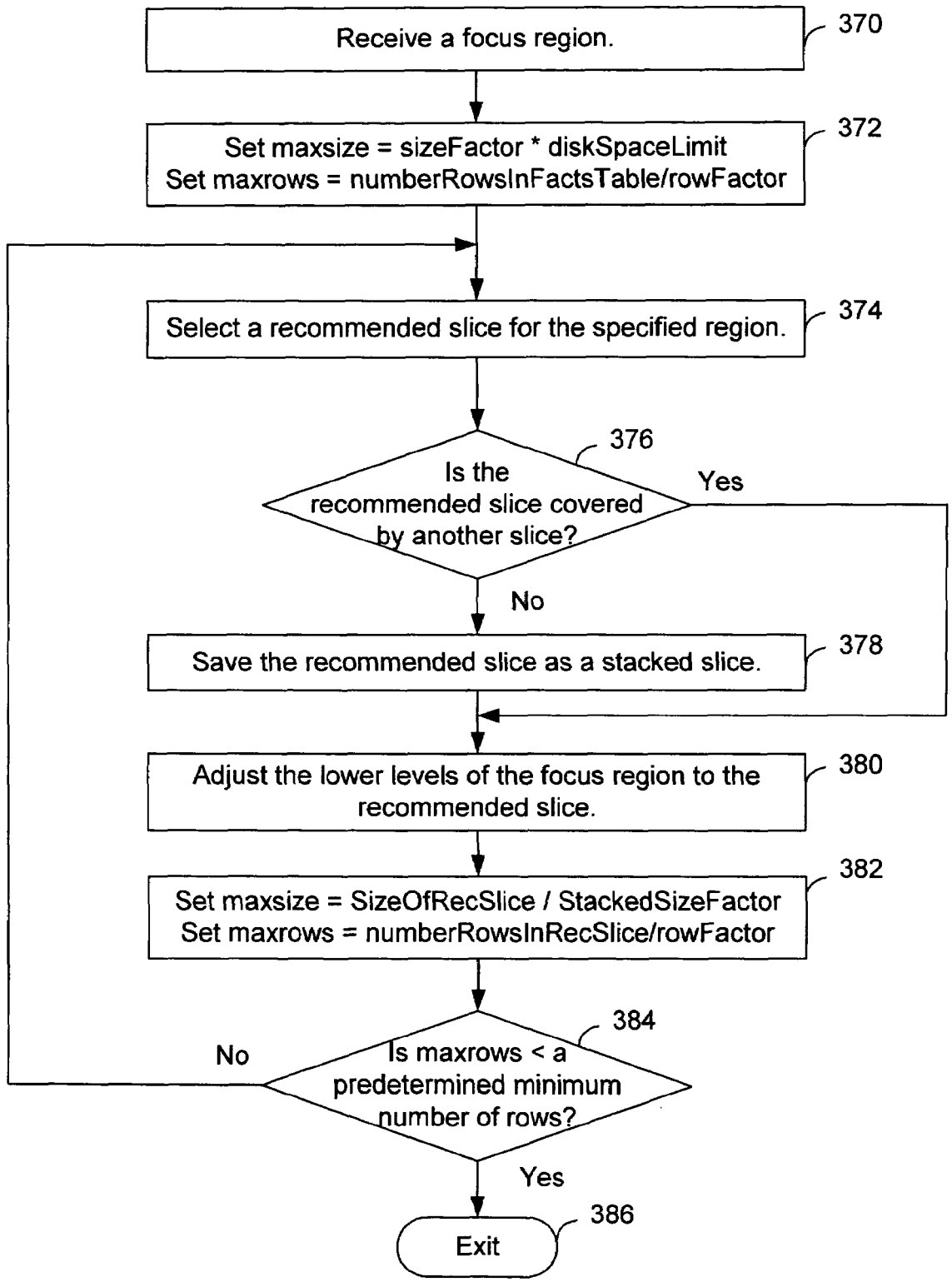
FIG. 15 depicts a flowchart of an embodiment of selecting combinations to determine stacked slices within a focus region.

FIG. 15 depicts a flowchart of an embodiment of selecting combinations to determine stacked slices within a focus region. In step 370, a focus region is received. In step 372, a variable called maxsize is set equal to the product of a predetermined sizeFactor and a specified diskSpaceLimit; another variable called maxrows is set equal to the number of Rows in the Facts Table divided by a predetermined row factor (row-Factor). In step 374, a recommended slice is selected for the specified region. In various embodiments, step 374 implements the flowchart of FIG. 13. Step 376 determines if the recommended slice is covered by another recommended slice. If not, the recommended slice is saved as a stacked slice. When step 376 determines that the recommended slice is covered by another recommended slice, step 376 proceeds to step 380. In step 380, the lower levels of the focus region are adjusted to the recommended slice. In step 382, maxsize is set equal to the size of the recommended slice (SizeOfRecSlice) divided by a predetermined StackedSizeFactor; and maxrows is set equal to the number of rows in the Facts table (numberRowsInRecSlice) divided by the predetermined row factor (rowFactor). Step 384 determines whether maxrows is less than a predetermined minimum number of rows. If not, step 384 proceeds to step 374. If so, the flowchart ends in step 386. In this way a set of recommended stacked slices is iteratively determined.

Figure 16:
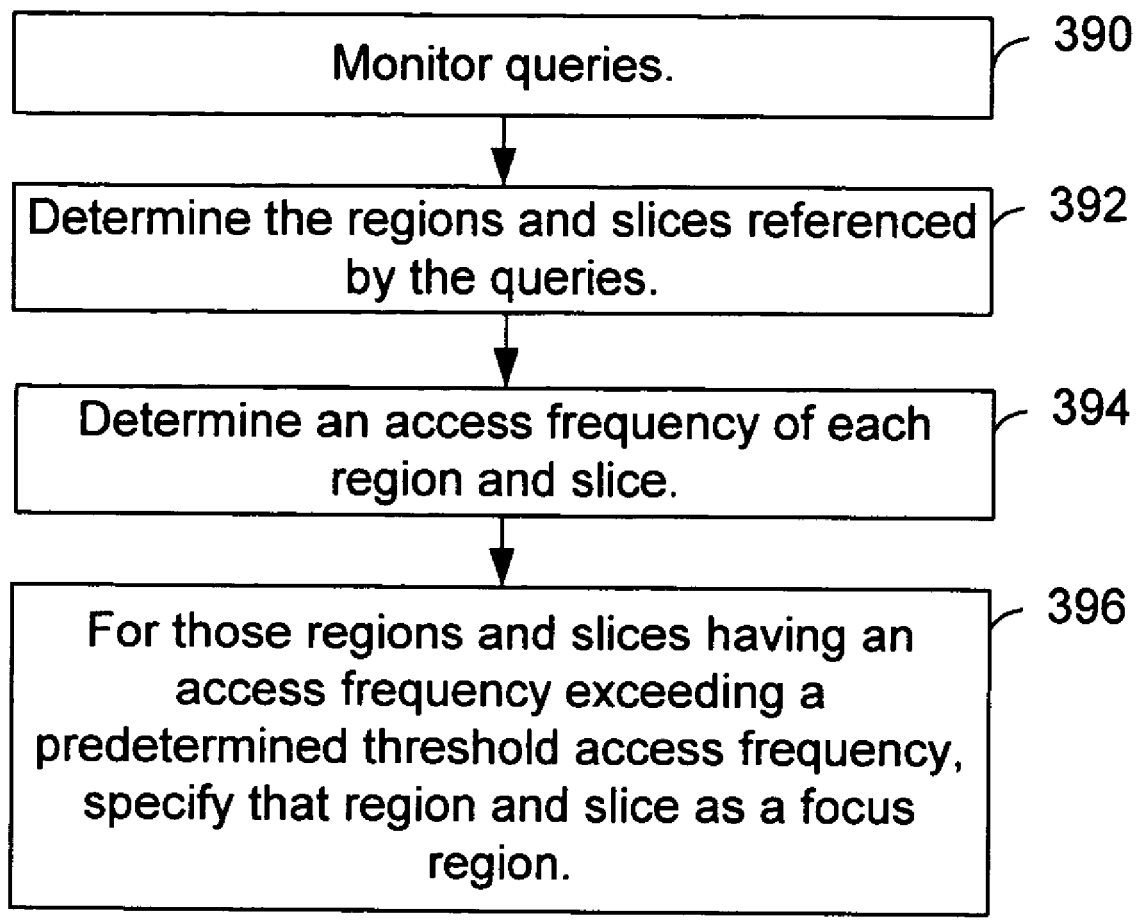
FIG. 16 depicts a flowchart of an embodiment of automatically specifying the focus region.

FIG. 16 depicts a flowchart of an embodiment of automatically specifying the focus region by the application. In step 390, the application 60 (FIG. 1) monitors queries. In step 392, the regions and slices referenced by the queries are determined. In step 394, an access frequency of each region and slice is determined. In step 396, for those regions and slices having an access frequency exceeding a predetermined threshold access frequency, that region or slice is specified as a focus region.

The rating of a slice in the evaluate cube query procedure will now be described. When considering alternative slices, the candidate slices are rated to determine the recommended slice. In certain implementations, one or more of the following criteria are used to evaluate the slices: 1) coverage, 2) space, 3) width, 4) column count, 5) nullability, 6) time, 7) usage history, 8) usage assumed, and 9) threshold.

As for coverage, a benefit of a slice is that if the slice is included in a summary table, then queries that use distributive measures can be satisfied by the summary table, provided the query is at or above the slice. This leads to the concept of coverage which is the number of slices of a cube that are covered by a particular slice. The top slice ("All" levels in each hierarchy) only covers a single slice (the "All" slice). The bottom slice, which includes the lowest level of each hierarchy, covers all slices.

As for space, part of the cost of a slice is the amount of disk space for storing the aggregations that are generated based on that slice. As for width, the table space specified for the summary table determines the maximum row width. This is relevant when hierarchies have many large attribute relationships as the slices may become constrained by width before space.

As for column count, the number of columns may be considered, since there is a certain amount of fixed processing per column. A column that can store a NULL is considered to be nullable. As for nullability, columns that are nullable are considered less desirable. There is some overhead for dealing with nullable columns. Nullable columns also eliminate the possibility of using refresh immediate summary tables. As for time, the time dimension is considered an important dimension. A high percentage of queries are expected to use attributes from the time dimension.

As for usage history, if metrics are available which provide information about the usage patterns of slices, then usage history can be considered. Slices that provide coverage for frequently used queries would be rated higher. As for usage assumed, if no usage history is available, then the usage is surmised based on the types of queries. For example, drill-down queries will use the higher level slices far more often than lower level slices. Report style queries on the other hand tend to hit slices fairly evenly. Drillthrough queries tend to not access the upper level slices.

As for threshold, when the size or width limits are approached, the rating may be adjusted to weight these more heavily. In other words, when there is plenty of space available using more is not a critical issue. But if 90% of the space has been used, then additional usage is minimized.

When optimizing a cube, there is a specified amount of diskspace available. In addition, the optimization is constrained by the width of the tablespace. As the code drills deeper into the cube model considering additional slices, the ability to drill deeper is constrained by how much space and width remain. Once either the space or width limits are reached then no more slices can be selected.

The following provide formulas for certain metrics:

Rating=(CoveragePoints+SizePoints+WidthPoints)/3

CoveragePoints=Percent of slice combinations covered by this slice

SizePoints=Percent of disk space available to store the aggregation(s) associated with this slice (this is a portion of the user provided disk space).

WidthPoints=Percent of tablespace width still available

In an alternative embodiment, the advisor uses the following formulas to determine the rating:

Rating=(CoveragePoints+SizePoints+WidthPoints+OtherPoints)/4

OtherPoints=Additional points (out of 100) awarded for other characteristics such as including a time dimension and non-nullable columns.

U.S. patent application Ser. No. 10/410,793, entitled "Method, System, and Program for Improving Performance of Database Queries," filed Apr. 9, 2003, to Nathan Gevaerd Colossi et al. describes various embodiments of rating slices.

In various embodiments, the advisor returns a response comprising the recommendation(s) to the user. In some embodiments, the response uses XML and comprises at least one or a combination of the following components as shown in Table 2. A component has a name and datatype. Table 2 also provides a description for each component.

TABLE 2

Response Components

| Name | Datatype | Description |
| --- | --- | --- |
| Status | XML element | Return code, type and message for operation. |
| Info | XML element | Provides additional details of the advisor operation to provide users with an understanding of decisions made by the advisor. This may show conditions that caused some parts of the model to not be optimized or additional information about what optimizations were done including why the aggregations and indexes were selected. |
| Diskspace | XML integer | An estimate of the total disk space for the recommended summary tables and indexes. |
| Sql | XML element | SQL instructions to create and populate a summary table and create indexes on it. The user is responsible for running. |
| refreshSql | XML element | SQL instructions to refresh the summary tables to synchronize them with base tables that have been updated. In some embodiments, may not be used when summary tables are refresh immediate. |

In an embodiment based on Table 2, above, the SQL instructions to create and populate a summary table are based on the recommended slice(s) for one or more measures. When the SQL instructions to create and populate a summary table are executed, one or more aggregations for the one or more measures are pre-computed.

In yet another embodiment, the advisor is required to recommend one or more slices specified by the focus region. In this embodiment, a user may specify a parameter, called "required," in the advisor request, and the advisor will recommend one or more slices (recommended slices) as specified by the focus region(s) for the specified cube. In an alternate embodiment, the "required" parameter is associated with a particular focus region in the meta-data create request, and the "required" parameter is stored in the meta-data 76 (FIG. 1) for the focus region. When the advisor determines that the "required" parameter is associated with the focus region, either by accessing the meta-data or from the parameter in the advisor request, the advisor generates a recommendation specifying the recommended slice or slices in the focus region associated with the "required" parameter, even if the slice or slices in the focus region associated with the "required" parameter do not meet the conditions set forth by other parameters, for example, the disk space limit.

In an alternate embodiment, the focus region specifies a region to exclude from the optimization process. For example, an "exclude" parameter is associated with a focus region in the meta-data create request to provide an excluded focus region, and the exclude parameter is stored in the meta-data for the focus region. In an alternate embodiment, the advisor determines an exclude focus region based on the statistics. For example, if the aggregations associated with a particular slice of a particular cube have not been accessed, the advisor generates an exclude focus region for that particular slice of that particular cube. The advisor stores the exclude focus region with the "exclude" parameter in the meta-data 76 (FIG. 1). When optimizing the cube, the advisor retrieves the exclude focus region with the "exclude" parameter from the meta-data. Based on the "exclude" parameter, the advisor excludes the slice(s) associated with the exclude focus region when determining a slice to recommend.

Although the focus region and combination have been described with respect to a multidimensional model in which each dimension is associated with a single hierarchy, in other embodiments, for example, when the multidimensional model does not have hierarchies, the focus region only comprises dimensions and the positions of the combination refer only to dimensions. Alternately, for example, when the multidimensional model uses only hierarchies, the focus region comprises only hierarchies and the positions of the combination refer only to hierarchies. In another embodiment, when a dimension is associated with multiple hierarchies, the focus region is associated with the hierarchies of the dimensions and each position of the combination is associated with a hierarchy of a dimension.

Various embodiments of the present invention can be applied to many OLAP applications—MOLAP, Relational OLAP (ROLAP), HOLAP and Data warehousing and OLAP (DOLAP) systems. In addition, some embodiments of the present invention may be used with any query language that is multidimensional in nature such as MDX, SQL and JOLAP.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of optimization of a multidimensional model in a model based performance advisor, the multidimensional model comprising a cube comprising a plurality of groups, each group of said plurality of groups having one or more levels, a first group of said plurality of groups having a first plurality of levels, and a second group of said plurality of groups having a second plurality of levels, comprising:

receiving a focus region request specifying a focus region, said focus region being specified by a user, said focus region being associated with said multidimensional model, said focus region request specifying a first query type associated with said focus region, said focus region request specifying said cube, said focus region being associated with said cube, said focus region request specifying a first particular level for said first group of said plurality of groups of said focus region, said focus region request specifying an any level for said second group of said plurality of groups of said focus region;

storing said focus region associated with said first query type and said cube;

receiving, from a user, a recommendation request specifying said cube, wherein said recommendation request is different from said focus region request;

in response to said recommendation request:

retrieving said focus region and said first query type based on said cube specified in said recommendation request;

evaluating, by said model based performance advisor, a plurality of candidate slices based on said focus region and said first query type that are retrieved based on said cube specified in said recommendation request, wherein said each candidate slice of said plurality of candidate slices comprises said first particular level of said first group and one level of said second plurality of levels of said second group, wherein said each candidate slice comprises one level of said each group of said plurality of groups, wherein said each candidate slice comprises a different combination of levels from other candidate slices of said plurality of candidate slices;

selecting a recommended slice from said plurality of candidate slices based on said evaluating, wherein said recommended slice comprises said first particular level of said first group of said focus region; and generating a query to create said recommended slice.

2. The method of claim 1 wherein a third group of said plurality of groups comprises a third plurality of levels, said focus region of said focus region request also specifies a range for said third group of said plurality of groups of said focus region, said range being specified by a first boundary level of said third plurality of levels of said third group, and a second boundary level of said third plurality of levels of said third group, wherein said focus region comprises a contiguous range of levels bounded by said first boundary level and said second boundary level for said third group, said range comprising less than every level of said third plurality of levels of said third group, wherein said evaluating said plurality of candidate slices, in response to said range being specified for said third group, said each candidate slice also comprises one level of said range of said third plurality of levels for said third group, wherein levels of said third group outside of said range are not included in said each candidate slice.

3. The method of claim 1 wherein said recommendation request also specifies an amount of disk space, wherein said evaluating said plurality of candidate slices comprises:

determining a rating for said each candidate slice, said rating being based on a percent of slice combinations covered by said each candidate slice, a percent of disk space available to store aggregations associated with said each candidate slice based on specified amount of disk space of said recommendation request, a width of a summary table to store said aggregations of said each candidate slice, whether any columns of said summary table are nullable, and whether any columns of said summary table are associated with a time group of said plurality of groups, wherein said selecting said recommended slice is also based on said rating for said each candidate slice.

4. The method of claim 1, wherein said focus region request also specifies at least one measure associated with said focus region, wherein said evaluating evaluates said candidate slices based on said at least one measure associated with said focus region, and does not evaluate said candidate slices based on any measures not associated with said focus region.

5. The method of claim 1 further comprising:

receiving another focus region request specifying an exclude region, said exclude region being associated with said multidimensional model, said another focus region request specifying a second query type associated with said exclude region, said focus region request specifying said cube, said exclude region being associated with said cube, said exclude region of said another focus region request specifying at least one exclude level for said each group of said plurality of groups;

storing said exclude region associated with said second query type and said cube;

wherein, in response to said recommendation request, said exclude region and said second query type are retrieved based on said cube specified in said recommendation request;

evaluating, by said model based performance advisor, another plurality of candidate slices of said cube based on said exclude region and said second query type that are retrieved, wherein no candidate slice of said another plurality of candidate slices comprises said at least one exclude level of said each group;

selecting another recommended slice from said another plurality of candidate slices of said cube based on said evaluating, said another recommended slice not comprising said at least one exclude level of said each group; and generating another query to create another recommended slice.

6. The method of claim 5 wherein said exclude region is determined based on whether aggregations of a particular slice have been accessed.

7. A system for optimizing a multidimensional model in a model based performance advisor, the multidimensional model comprising a cube comprising a plurality of groups, each group of said plurality of groups having one or more levels, a first group of said plurality of groups having a first plurality of levels, and a second group of said plurality of groups having a second plurality of levels, comprising:

a processor; and a memory storing a plurality of instructions executable by said processor, said plurality of instructions comprising instructions for:

receiving a focus region request specifying a focus region, said focus region being specified by a user, said focus region being associated with said multidimensional model, said focus region request specifying a first query type associated with said focus region, said focus region request specifying said cube, said focus region being associated with said cube, said focus region request specifying a first particular level for said first group of said plurality of groups of said focus region, said focus region request specifying an any level for said second group of said plurality of groups of said focus region;

storing said focus region associated with said first query type and said cube;

receiving, from a user, a recommendation request specifying said cube, wherein said recommendation request is different from said focus region request;

in response to said recommendation request:

retrieving said focus region and said first query type based on said cube specified in said recommendation request;

evaluating, by said model based performance advisor, a plurality of candidate slices based on said focus region and said first query type that are retrieved based on said cube specified in said recommendation request, wherein said each candidate slice of said plurality of candidate slices comprises said first particular level of said first group and one level of said second plurality of levels of said second group, wherein said each candidate slice comprises one level of said each group of said plurality of groups, wherein said each candidate slice comprises a different combination of levels from other candidate slices of said plurality of candidate slices;

selecting a recommended slice from said plurality of candidate slices based on said evaluating, wherein said recommended slice comprises said first particular level of said first group of said focus region; and generating a query to create said recommended slice.

8. The system of claim 7 wherein a third group of said plurality of groups comprises a third plurality of levels, said focus region of said focus region request also specifies a range for said third group of said plurality of groups of said focus region, said range being specified by a first boundary level of said third plurality of levels of said third group, and a second boundary level of said third plurality of levels of said third group, wherein said focus region comprises a contiguous range of levels bounded by said first boundary level and said second boundary level for said third group, said range comprising less than every level of said third plurality of levels of said third group, wherein said evaluating said plurality of candidate slices, in response to said range being specified for said third group, said each candidate slice also comprises one level of said range of said third plurality of levels for said third group, wherein levels of said third group outside of said range are not included in said each candidate slice.

9. The system of claim 7 wherein said recommendation request also specifies an amount of disk space, wherein said evaluating said plurality of candidate slices comprises:

determining a rating for said each candidate slice, said rating being based on a percent of slice combinations covered by said each candidate slice, a percent of disk space available to store aggregations associated with said each candidate slice based on specified amount of disk space of said recommendation request, a width of a summary table to store said aggregations of said each candidate slice, whether any columns of said summary table are nullable, and whether any columns of said summary table are associated with a time group of said plurality of groups, wherein said selecting said recommended slice is also based on said rating for said each candidate slice.

10. The system of claim 7, wherein said focus region request also specifies at least one measure associated with said focus region, wherein said evaluating evaluates said candidate slices based on said at least one measure associated with said focus region, and does not evaluate said candidate slices based on any measures not associated with said focus region.

11. The system of claim 7 said memory comprising instructions for:

receiving another focus region request specifying an exclude region, said exclude region being associated with said multidimensional model, said another focus region request specifying a second query type associated with said exclude region, said focus region request specifying said cube, said exclude region being associated with said cube, said exclude region of said another focus region request specifying at least one exclude level for said each group of said plurality of groups;

storing said exclude region associated with said second query type and said cube;

wherein, in response to said recommendation request, said exclude region and said second query type are retrieved based on said cube specified in said recommendation request;

evaluating, by said model based performance advisor, another plurality of candidate slices of said cube based on said exclude region and said second query type that are retrieved, wherein no candidate slice of said another plurality of candidate slices comprises said at least one exclude level of said each group;

selecting another recommended slice from said another plurality of candidate slices of said cube based on said evaluating, said another recommended slice not comprising said at least one exclude level of said each group; and generating another query to create another recommended slice.

12. The system of claim 11 wherein said exclude region is determined based on whether aggregations of a particular slice have been accessed.

13. A computer program product comprising a computer-readable medium, said computer program product for optimizing a multidimensional model in a model based performance advisor, the multidimensional model comprising a cube comprising a plurality of groups, each group of said plurality of groups having one or more levels, a first group of said plurality of groups having a first plurality of levels, and a second group of said plurality of groups having a second plurality of levels, said computer program product comprising:

first program instructions to receive a focus region request specifying a focus region, said focus region being specified by a user, said focus region being associated with said multidimensional model, said focus region request specifying a first query type associated with said focus region, said focus region request specifying said cube, said focus region being associated with said cube, said focus region request specifying a first particular level for said first group of said plurality of groups of said focus region, said focus region request specifying an any level for said second group of said plurality of groups of said focus region;

second program instructions to store said focus region associated with said first query type and said cube;

third program instructions to receive, from a user, a recommendation request specifying said cube, wherein said recommendation request is different from said focus region request;

fourth program instructions to, in response to said recommendation request:

retrieve said focus region and said first query type based on said cube specified in said recommendation request;

evaluate, by said model based performance advisor, a plurality of candidate slices based on said focus region and said first query type that are retrieved based on said cube specified in said recommendation request, wherein said each candidate slice of said plurality of candidate slices comprises said first particular level of said first group and one level of said second plurality of levels of said second group, wherein said each candidate slice comprises one level of said each group of said plurality of groups, wherein said each candidate slice comprises a different combination of levels from other candidate slices of said plurality of candidate slices;

select a recommended slice from said plurality of candidate slices based on said evaluating, wherein said recommended slice comprises said first particular level of said first group of said focus region; and generate a query to create said recommended slice;

wherein said first, second, third and fourth program instructions are stored on said computer-readable medium.

14. The computer program product of claim 13 wherein a third group of said plurality of groups comprises a third plurality of levels, said focus region of said focus region request also specifies a range for said third group of said plurality of groups of said focus region, said range being specified by a first boundary level of said third plurality of levels of said third group, and a second boundary level of said third plurality of levels of said third group, wherein said focus region comprises a contiguous range of levels bounded by said first boundary level and said second boundary level for said third group, said range comprising less than every level of said third plurality of levels of said third group, wherein said evaluate said plurality of candidate slices, in response to said range being specified for said third group, said each candidate slice also comprises one level of said range of said third plurality of levels for said third group, wherein levels of said third group outside of said range are not included in said each candidate slice.

15. The computer program product of claim 13 wherein said recommendation request also specifies an amount of disk space, wherein said evaluate said plurality of candidate slices comprises:

determine a rating for said each candidate slice, said rating being based on a percent of slice combinations covered by said each candidate slice, a percent of disk space available to store aggregations associated with said each candidate slice based on specified amount of disk space of said recommendation request, a width of a summary table to store said aggregations of said each candidate slice, whether any columns of said summary table are nullable, and whether any columns of said summary table are associated with a time group of said plurality of groups, wherein said select said recommended slice is also based on said rating for said each candidate slice.

16. The computer program product of claim 13, wherein said focus region request also specifies at least one measure associated with said focus region, wherein said evaluate evaluates said candidate slices based on said at least one measure associated with said focus region, and does not evaluate said candidate slices based on any measures not associated with said focus region.

17. The computer program product of claim 13 further comprising:

fifth program instructions to receive another focus region request specifying an exclude region, said exclude region being associated with said multidimensional model, said another focus region request specifying a second query type associated with said exclude region, said focus region request specifying said cube, said exclude region being associated with said cube, said exclude region of said another focus region request specifying at least one exclude level for said each group of said plurality of groups;

sixth program instructions to store said exclude region associated with said second query type and said cube;

wherein said fourth program instructions, in response to said recommendation request, said exclude region and said second query type are retrieved based on said cube specified in said recommendation request;

wherein said fourth program instructions evaluate, by said model based performance advisor, another plurality of candidate slices of said cube based on said exclude region and said second query type that are retrieved, wherein no candidate slice of said another plurality of candidate slices comprises said at least one exclude level of said each group;

wherein said fourth program instructions select another recommended slice from said another plurality of candidate slices of said cube based on said evaluating, said another recommended slice not comprising said at least one exclude level of said each group; and wherein said fourth program instructions generate another query to create another recommended slice;

wherein said fifth program instructions and said sixth program instructions are stored on said computer-readable medium.

18. The computer program product of claim 17 wherein said exclude region is determined based on whether aggregations of a particular slice have been accessed.

* * * * *